United States Patent
Nomura et al.

(10) Patent No.: US 8,637,177 B2
(45) Date of Patent: Jan. 28, 2014

(54) ELECTROCHEMICAL DEVICE

(75) Inventors: Hirokazu Nomura, Kyoto (JP); Akira Yamashita, Kyoto (JP); Fusaji Kita, Kyoto (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 0 days.

(21) Appl. No.: 13/255,897

(22) PCT Filed: Mar. 12, 2010

(86) PCT No.: PCT/JP2010/054244
§ 371 (c)(1),
(2), (4) Date: Sep. 9, 2011

(87) PCT Pub. No.: WO2010/106984
PCT Pub. Date: Sep. 23, 2010

(65) Prior Publication Data
US 2011/0318631 A1 Dec. 29, 2011

(30) Foreign Application Priority Data

Mar. 18, 2009 (JP) ................. 2009-066907
Mar. 18, 2009 (JP) ................. 2009-066924
Mar. 18, 2009 (JP) ................. 2009-066937
Jun. 17, 2009 (JP) ................. 2009-143873
Sep. 8, 2009 (JP) ................. 2009-207025
Sep. 8, 2009 (JP) ................. 2009-207039

(51) Int. Cl.
*H01M 2/16* (2006.01)
*H01G 9/02* (2006.01)

(52) U.S. Cl.
USPC .......................................... 429/144; 361/502

(58) Field of Classification Search
USPC ............ 429/209, 251, 231.95, 200, 326, 144; 361/502
See application file for complete search history.

(56) References Cited

U.S. PATENT DOCUMENTS 6,040,092 A * 3/2000 Yamada et al. ............... 429/331
6,632,569 B1 10/2003 Kameda et al.
(Continued)

FOREIGN PATENT DOCUMENTS

JP 2000-223120 A 8/2000
JP 2000-340232 A 12/2000
(Continued)

OTHER PUBLICATIONS

International Search Report for PCT International Application No. PCT/JP2010/054244, mailed Jun. 15, 2010.
(Continued)

*Primary Examiner* — Mark F Huff
*Assistant Examiner* — Monique Wills
(74) *Attorney, Agent, or Firm* — Birch, Stewart, Kolasch & Birch, LLP.

(57) ABSTRACT

The electrochemical device of the present invention comprises a positive electrode (2), a negative electrode (1), a nonaqueous electrolyte and a separator (3). The separator (3) includes a porous layer (I) composed of a microporous film composed predominantly of a thermoplastic resin and a porous layer (II) containing a filler having a heat-resistant temperature of 150° C. or higher as the main component. The negative electrode (1) contains graphite having an R value of 0.1 to 0.5 and $d_{002}$ of 0.338 nm or less as a negative electrode active material, where the R value is a ratio of a peak intensity at 1360 cm$^{-1}$ to a peak intensity at 1580 cm$^{-1}$ in an argon ion laser Raman spectrum and the $d_{002}$ is a lattice spacing between 002 planes. The ratio of the graphite to the negative electrode active material is 30 mass % or more, and the nonaqueous electrolyte contains vinyl ethylene carbonate or a derivative thereof, or a dinitrile compound or acid anhydride.

16 Claims, 2 Drawing Sheets

(56) References Cited

U.S. PATENT DOCUMENTS

| | | |
|---|---|---|
| 2006/0147799 A1* | 7/2006 | Hayashi et al. ............ 429/231.8 |
| 2006/0166091 A1 | 7/2006 | Deguchi et al. |
| 2007/0048607 A1* | 3/2007 | Nakashima et al. .......... 429/209 |
| 2008/0057402 A1* | 3/2008 | Abe et al. ...................... 429/333 |
| 2008/0193834 A1 | 8/2008 | Murakami et al. |
| 2009/0067119 A1 | 3/2009 | Katayama et al. |
| 2010/0015521 A1 | 1/2010 | Kim |
| 2010/0028786 A1 | 2/2010 | Takahashi |
| 2010/0068612 A1 | 3/2010 | Nishikawa |
| 2010/0285348 A1 | 11/2010 | Murata et al. |

FOREIGN PATENT DOCUMENTS

| | | |
|---|---|---|
| JP | 2005-174867 A | 6/2005 |
| JP | 2006-236981 A | 9/2006 |
| JP | 2008-186721 A | 8/2008 |
| JP | 2008-192483 A | 8/2008 |
| JP | 2008-198432 A | 8/2008 |
| JP | 2008-282735 A | 11/2008 |
| JP | 2010-015968 A | 1/2010 |
| JP | 2010-056076 A | 3/2010 |
| WO | WO 2007/066768 A1 | 6/2007 |
| WO | WO 2008/062727 A1 | 5/2008 |

OTHER PUBLICATIONS

Chinese Office Action for Application No. 201080010215.1 dated Jul. 3, 2013.

* cited by examiner

ELECTROCHEMICAL DEVICE

TECHNICAL FIELD

The present invention relates to an electrochemical device having an excellent level of safety in the event of being overcharged and also having excellent high-temperature storability and low-temperature charge characteristics.

BACKGROUND ART

Electrochemical devices such as a lithium secondary battery are characterized by a high energy density, and thus have been widely used as power sources for portable equipment such as a portable telephone and a notebook personal computer. For example, the capacity of the lithium secondary battery is likely to increase further as the performance of the portable equipment becomes higher. For this reason, it is important to ensure the safety of the lithium secondary battery In the current lithium secondary battery, for example, a polyolefin-based microporous film having a thickness of about 20 to 30 µm is used as a separator that is interposed between a positive electrode and a negative electrode. Polyethylene with a low melting point is used in some cases as the material of a separator to ensure a so-called shutdown effect. The shutdown effect improves the safety of the battery in the event of a short circuit by allowing the resin constituting the separator to melt at temperatures equal to or lower than the thermal runaway temperature of the battery to close the pores to increase the internal resistance of the battery A uniaxially—or biaxially—oriented film is used for be separator to improve the porosity and strength. Since such a separator is provided as an independent film, it needs to have a certain level of strength in view of workability, and the drawing ensures the strength of the separator. In such a uniaxially—or biaxially—oriented film, however, the degree of crystallinity is increased, and the shutdown temperature is also raised close to the thermal runaway temperature of the battery. Thus, it is hard to say that the margin for safety of the battery is sufficient.

Moreover, the film has been distorted by drawing and may shrink due to residual stress when it is subjected to high temperatures. The shrinkage temperature is very dose to the melting point, namely the shutdown temperature. Therefore, when the polyolefin-based microporous film is used as a separator, a rise in temperature of the battery has to be prevented by reducing the current as soon as the temperature of the battery reaches the shutdown temperature due to charging anomaly or the like If the pores are not sufficiently closed and the current cannot be immediately reduced, the temperature of the battery is easily raised to the shrinkage temperature of the separator, so that an internal short circuit can occur.

As a technique to prevent such a short circuit caused by thermal shrinkage of a separator to improve the reliability of a battery, for example, it is proposed to use a porous separator having a first separator layer containing a resin for ensuring the shutdown function as the main component and a second separator layer containing a filler having a heat-resistant temperature of 150° C. or higher as the main component in forming an electrochemical device (Patent document 1).

By the technique of Patent document 1, it is possible to provide an electrochemical device, such as a lithium secondary battery, that has an excellent level of safety and does not exhibit thermal runaway even when the element is overheated anomalously.

Further, it has been contemplated in a variety of ways to make improvements to electrochemical devices such as a lithium secondary battery in characteristics other than the safety: For example, Patent documents 2 and 3 disclose that the use of a negative electrode active material whose surface is coated with a low-crystalline carbon material allows an increase in the capacity. It also allows a reduction in the irreversible capacity at the initial charge-discharge cycle, so that the charge-discharge cycle capacity retention rate can be increased to significantly improve quick charge characteristics

PRIOR ART DOCUMENT

Patent Document

Patent Document 1: WO 2007/66768 A1
Patent Document 2: JP2000-223120 A
Patent Document 3: JP2000-340232 A

DISCLOSURE OF INVENTION

Problem to be Solved by the Invention

Recently, there are tendencies to increase the capacity of electrochemical devices such as a lithium secondary battery as the performance of the equipment to which the electrochemical devices are applied becomes higher. At the same time, it is required to ensure a higher level of safety against overcharging. Although the electrochemical device disclosed in Patent document 1 has a favorable level of safety against overcharging, it can be expected that in the future there will be demands for a technique far superior to the one disclosed in Patent document 1.

Further, considering that electrochemical devices are used in a variety of temperature environments, they are required to have charge characteristics that do not cause problems in actual use even in a low temperature environment where the reactivity of the electrochemical devices decreases.

Furthermore, electrochemical devices are required to have storability that does not cause abnormalities such as battery swelling even in a situation where they are retained in a high temperature environment.

Further, when using the negative electrode active material whose surface is coated with a low-crystalline carbon material, dips and projections on the surface of the negative electrode mixture layer increase depending on the shape of the particles. This may lead to an increase in the number of short circuits as the projections on the surface of the negative electrode are pressed against the separator, and the increase may result in the deterioration of the productivity of the battery.

With the foregoing in mind, it is an object of the present invention to provide an electrochemical device having an excellent level of safety in the event of being overcharged and also having excellent high-temperature storability, low-temperature charge characteristics, and productivity.

Means for Solving Problem

The electrochemical device of the present invention is an electrochemical device including a positive electrode, a negative electrode, a nonaqueous electrolyte, and a separator. The separator includes a porous layer (I) composed of a microporous film predominantly composed of a thermoplastic resin and a porous layer (II) containing a filler having a heat-resistant temperature of 150° C. or higher as the main component. The negative electrode contains graphite having an R value of 0.1 to 0.5 and $d_{002}$ of 0.338 nm or less as a negative electrode active material, where the R value is a ratio of a peak intensity at 1360 cm$^{-1}$ to a peak intensity at 1580 cm$^{-1}$ in an argon ion laser Raman spectrum and the $d_{002}$ is a lattice spacing between 002 planes. The ratio of the graphite to the negative electrode active material is 30 mass % or more, and the nonaqueous electrolyte contains vinyl ethylene carbonate or a derivative thereof, or a dinitrile compound or acid anhydride.

Effects of the Invention

According to the present invention, it is possible to provide an electrochemical device having an excellent level of safety in the event of being overcharged and also having excellent high-temperature storability, low-temperature (particularly at low temperatures equal to or lower than 0° C.) charge characteristics, and productivity.

DESCRIPTION OF THE INVENTION

Figure 1A:
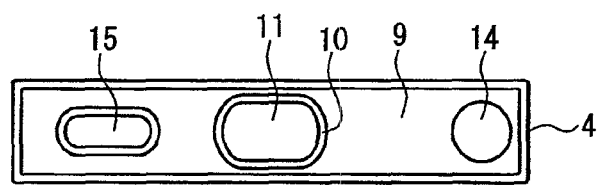
FIG. 1 is a schematic plan view of a lithium secondary battery according to the present invention.
FIG. 1B is a schematic cross-sectional view of the lithium secondary battery shown in FIG. 1A.

The electrochemical device of the present invention includes a positive electrode, a negative electrode, a nonaqueous electrolyte, and a separator. The separator includes a porous layer (I) composed of a microporous film composed predominantly of a thermoplastic resin and a porous layer (II) containing a filler having a heat-resistant temperature of 150° C. or higher as the main component. The negative electrode contains graphite having an R value of 0.1 to 0 5 and $d_{002}$ of 0.338 nm or less as a negative electrode active material, where the R value is a ratio of a peak intensity at 1360 cm$^{-1}$ to a peak intensity at 1580 cm$^{-1}$ in an argon ion laser Raman spectrum and the $d_{002}$ is a lattice spacing between 002 planes. The ratio of the graphite to the negative electrode active material is 30 mass % or more and the nonaqueous electrolyte contains vinyl ethylene carbonate or a derivative thereof, or a dinitrile compound or acid anhydride.

The phrase "having a heat-resistant temperature of 150° C. or higher" as described herein means that changes such as softening cannot be seen at least at 150° C. This does not apply to a porous base that will be described later.

Further, the porous layer (I) being "composed predominantly of a thermoplastic resin" as described herein means that the thermoplastic resin constitutes 50 vol % or more of the solids of the porous layer (I). Furthermore, the porous layer (II) "containing a filler having a heat-resistant temperature of 150° C. or higher as the main component" as described herein means that the filler having a heat-resistant temperature of 150° C. or higher constitutes 50 vol % or more of the solids of the layer (however, when using the later-described porous base, it is the ratio of the filler to the solids other than the later-described porous base).

The separator included in the electrochemical device of the present invention includes the porous layer (I) composed of a microporous film composed predominantly of a thermoplastic resin and the porous layer (II) containing a filler having a heat-resistant temperature of 150° C. or higher as the main component.

The porous layer (I) of the separator is primarily for ensuring the shutdown function. When the temperature of the electrochemical device of the present invention exceeds the melting point of the thermoplastic resin (hereinafter referred to as the resin (A)) as the main component of the porous layer (I), the resin (A) forming the porous layer (I) melts and closes the pores of the separator to cause a shutdown to suppress the development of an electrochemical reaction.

The porous layer (II) of the separator has a function of preventing a short circuit caused by direct contact between the positive electrode and the negative electrode also when the temperature inside the electrochemical device rises. The function is ensured by the filler having a heat-resistant temperature of 150° C. or higher. That is, when the temperature of the electrochemical device rises to a high temperature and the porous layer (I) shrinks, the porous layer (II), which is less susceptible to shrinkage, prevents a short circuit caused by direct contact between the positive electrode and the negative electrode that may occur when the separator shrinks by the heat. As will be described later; when the porous layers (I) and (II) are integrated with each other, the heat-resistant porous layer (II) serves as the skeleton of the separator and suppresses thermal shrinkage of the porous layer (I), in other words, thermal shrinkage of the separator as a whole.

The resin (A) of the porous layer (I) is not particularly limited as long as it is a thermoplastic resin that is electrically insulative, stable electrochemically and in a nonaqueous electrolyte (described later in detail) included in the electrochemical device as well as in solvents (described later in detail) used in producing the separator. As the resin (A), polyolefins such as polyethylene (PE), polypropylene (PP), and an ethylene-propylene copolymer; and polyesters such as polyethylene terephthalate and copolymerized polyester are preferable.

The separator used in the present invention preferably has such a property that its pores are dosed (i.e., the shutdown function) in the temperature range of 80° C. to 150° C. (more preferably 100° C. or higher). For this reason, it is more preferable to use, as a component of the porous layer (I), a thermoplastic resin whose melting point, namely, melting temperature measured with a differential scanning calorimeter (DSC) according to the regulations of Japanese Industrial Standards (JIS) K 7121 is in the range of 80° C. to 150° C., more preferably 100° C. to 150° C. The porous layer (I) is preferably composed of a single-layered microporous film composed predominantly of PE or a laminated microporous film formed by laminating two to five PE and PP layers.

When using a thermoplastic resin having a melting point in the range of 80° C. to 150° C. like PE and a thermoplastic resin having a melting point higher than 150° C. like PP in combination in forming the porous layer (I), for example, using a microporous film composed of a mixture of PE and a resin, such as PP, that has a higher melting point than PE or a laminated microporous film formed by laminating PE layers and layers of a resin, such as PP, that has a higher melting point than PE as the porous layer (I), it is preferable that the resin having a melting point in the range of 80° C. to 150° C. (e.g., PE) constitutes 30 mass % or more, more preferably 50 mass % or more of the resins (A) forming the porous layer (I).

As the microporous films described above, it is possible to use microporous films that have been are used in conventionally known lithium secondary batteries and are composed of the thermoplastic resins listed above as examples. That is, it is possible to use ion-permeable microporous films produced by, for example, a solvent extraction process, a dry drawing process, or a wet drawing process as the microporous film.

Further, to improve the strength of the porous layer (I), it is possible to include a filler or the like in the porous layer (I) within the bounds of not compromising the effect of providing the separator with the shutdown function. Examples of fillers that can be used in the porous layer (I) include a filler that can be used in the porous layer (II) (i.e., the filler having a heat-resistant temperature of 150° C. or higher) (described later).

It is preferable that the filler has a particle size (average particle size) in the range of 0.01 µm to 10 µm, and more preferably 0.1 µm to 1 µm. The average particle size as described herein can be defined as a number-average particle size measured with, for example, a laser diffraction particle size analyzer ("LA-920" manufactured by HORIBA, Ltd.) by dispersing fine particles of the filler in a medium in which the filler does not dissolve. The same applies to the later-described filler used in the porous layer (II).

As a result of using the porous layer (I) configured as described above, the shutdown function can be imparted to the separator with ease, so that the safety against an increase in the temperature inside the electrochemical device can be ensured with ease.

To achieve the shutdown effect more easily, the content of the resin (A) in the porous layer (I) is preferably as follows. The resin (A) as the main component constitutes 50 vol % or more, more preferably 70 vol % or more of the entire components of the porous layer (I) and the resin (A) may constitute 100 vol % of the entire components. Furthermore, it is preferable that the porous layer (II) has a porosity of 20 to 60%, and the volume of the resin (A) is equal to or larger than 50% of the pore volume of the porous layer (II). The porosity can be determined by a method described later.

As long as the filler used in the porous layer (II) has a heat-resistant temperature of 150° C. or higher and has such electrochemical stability that it is stable in the electrolyte included in the electrochemical device and is less susceptible to oxidation/reduction in the working voltage range of the electrochemical device, it may be organic or inorganic particles. However, fine particles are preferred in terms of dispersibility and inorganic fine particles can be used more preferably in terms of stability (in particular, resistance to oxidation).

Specific examples of components of the inorganic particles include: inorganic oxides such as iron oxide, $Al_2O_3$ (alumina), $SiO_2$ (silica), $TiO_2$, $BaTiO_3$, and $ZrO_2$; inorganic nitrides such as aluminum nitride and silicon nitride; hardly-soluble ionic compounds such as calcium fluoride, barium fluoride, and barium sulfate; covalent compounds such as silicon and diamond; and clays such as montmorillonite. Here, the inorganic oxides may be of materials derived from mineral resources such as boehmite, zeolite, apatite, kaoline, mullite, spinel, olivine, and mica, or of artificial products thereof. Further, the particles can be provided with electric insulation by coating the surface of a conductive material such as a metal, conductive oxides such as $SnO_2$ and a tin-indium oxide (ITO), or carbonaceous materials such as carbon black and graphite with an electrically insulative material such as the above-mentioned inorganic oxides. The inorganic particles are preferably particles (fine particles) of any of the above-mentioned inorganic oxides, more preferably plate-like particles of alumina, silica, or boehmite in view of further improving the resistivity of the porous layer (II) to oxidization.

Examples of the organic particles (organic powders) include a variety of crosslinked polymer particles such as crosslinked polymethyl methacrylate, crosslinked polystyrene, crosslinked polydivinylenzene, a crosslinked styrene-divinylbenzene copolymer, polyimide, a melamine resin, a phenol resin, and a benzoguanamine-formaldehyde condensation product; and heat-resistant polymer particles such as polysulfone, polyacrylonitrile, aramid, polyacetal, and thermoplastic polyimide. The organic resins (polymers) forming these organic particles may be a mixture, a modification, a derivative, a copolymer (a random copolymer, an alternating copolymer, a block copolymer, a graft copolymer), or a crosslinked body of the above-mentioned materials.

Although the shape of the filler having a heat-resistant temperature of 150° C. or higher may be substantially spherical or plate-like, for example, at least a part of the filler contained in the porous layer (II) is preferably in the form of plate-like particles. The filler may be entirely in the form of plate-like particles. Even when the porous layers (I) and (II) are integrated with each other, inclusion of the plate-like particles in the porous layer (II) allows suppression of shrinkage force that acts on the porous layer (I) because the plate-like particles collide with each other. Further, with the use of the plate-like particles, the length of a path between the positive electrode and the negative electrode in the separator, i.e., a so-called tortuosity factor, increases. For this reason, even when dendrites are formed, it becomes difficult for the dendrites to reach the positive electrode from the negative electrode, and thus the reliability with respect to a short circuit caused by the dendrites can be improved.

A variety of commercial products are available as the plate-like filler. Examples of the commercial products include the following: $SiO_2$, "SUNLOVELY (trade name)" manufactured by AGC Si-Tech Co., Ltd.; $TiO_2$, a ground product of "NST-B1 (trade name)" manufactured by ISHIHARA SANGYO KAISHA, LTD.; a plate-like barium sulfate, "H series (trade name)" and "HL series (trade name)" manufactured by SAKAI CHEMICAL INDUSTRY CO., LTD.; talc, "MICRON WHITE (trade name)" manufactured by Hayashi Kasei Co., Ltd.; bentonite, "BEN-GEL (trade name)" manufactured by Hayashi Kasei Co., Ltd.; boehmite, "BMM (trade name)" and "BMT (trade name)" manufactured by KAWAI LIME INDUSTRY CO., LTD.; alumina ($Al_2O_3$), "Serashyru BMT-B (trade name)" manufactured by KAWAI LIME INDUSTRY CO., LTD.; alumina, "SERATH (trade name)" manufactured by KINSEI MATEC CO., LTD.; and sericite, "HIKAWA-MICA Z-20 (trade name)" manufactured by Hikawa Kogyo Co., Ltd. In addition to the above, $SiO_2$, $Al_2O_3$, ZrO, and $CeO_2$ can be produced by the method disclosed in JP 2003-206475 A.

When the filler is in the form of plate-like particles, the aspect ratio (the maximum length of the plate-like particles/the thickness of the plate-like particles) is in the range of preferably 5 to 100, and more preferably 10 to 50. The aspect ratio of the plate-like particles can be determined by analyzing the scanning electron microscope (SEM) images.

The plate-like filler is susceptible to cracking on impact when it has a small thickness. Thus, the plate-like filler has an average thickness of preferably 0.02 µm or more, and more preferably 0.05 µm or more. However, when the thickness of the plate-like filler is too large, the thickness of the separator increases. This could cause, for example, a decline in the discharge capacity and the porous layer (II) becomes susceptible to breakage when producing the electrochemical device. For this reason, the plate-like filler has an average thickness of preferably 0.7 µm or less, and more preferably 0.5 µm or less.

Further, at least a part of the filler contained in the porous layer (II) is in the form of fine particles having a secondary particle structure in which primary particles are agglomerated. The filler may be entirely in the form of fine particles having the secondary particle structure. By incorporating the filler having the secondary particle structure into the porous layer (II), it is possible to achieve, as with the case of using the plate-like particles as described above, suppression of thermal shrinkage and prevention of a short circuit caused by dendrites. Examples of fillers having the secondary particle structure include the following: boehmite, "C06 (trade name)" and "C20 (trade name)" manufactured by TAIMEI CHEMICALS CO., LTD.; $CaCO_3$, "ED-1 (trade name)" manufactured by KOMESHO SEKKAI KOGYO CO., LTD; and clay, "Zeolex 94HP (trade name)" manufactured by J. M. Huber Corporation.

For example, the filler contained in the porous layer (II) has an average particle size (the average particle size determined by the above-described measuring method applies also to the filler having the secondary particle structure) in the range of preferably 0.01 µm to 15 µm, and more preferably 0.1 µm to 5 µm.

The amount of the filler having a heat-resistant temperature of 150° C. or higher in the porous layer (II) is 50 vol % or more, preferably 70 vol % or more, more preferably 80 vol % or more, and still more preferably 90 vol % or more of the total volume of the components of the porous layer (II) (when using the later-described porous base, the total volume of the components other than the porous base. The same is true in the following.). By including the filler in the porous layer (II) in a large amount as described above, it is possible to prevent more favorably the occurrence of a short circuit caused by direct contact between the positive electrode and the negative electrode that occurs when the temperature of the electrochemical device rises and becomes high. Further, when the separator has a structure in which the porous layers (I) and (II) are integrated with each other, thermal shrinkage of the separator as a whole can be suppressed favorably.

It is preferable to include an organic binder in the porous layer (II) so as to bond the particles of the filler having a heat-resistant temperature of 150° C. or higher to each other or to bond the porous layers (I) and (II) to each other as needed. From such view points, the preferred upper limit of the amount of the filler having a heat-resistant temperature of 150° C. or higher in the porous layer (II) is, for example, 99.5 vol % of the total volume of the components of the porous layer (II). When the amount of the filler having a heat-resistant temperature of 150° C. or higher in the porous layer (II) is less than 70 vol %, it is necessary to increase the amount of the organic binder in the porous layer (ID. In this case, the pores of the porous layer (II) are likely to be filled with the organic binder, which may lead to deterioration of the functions as the separator. Further, if a hole-opening agent or the like is used to provide the porous layer, the space between the particles of the filler becomes too large, so that the effect of suppressing thermal shrinkage may decline.

When using plate-like particles as the filler having a heat-resistant temperature of 150° C. or higher, it is preferable that the plate-like particles are present in the porous layer (II) such that their plane surfaces are substantially parallel to the surface of the separator. More specifically, the angle between the plane surface of each plate-like particle in the vicinity of the surface of the separator and the surface of the separator is preferably 30° or less in average, and most preferably 0°, in other words, the plane surface of each plate-like particle in the vicinity of the surface of the separator is parallel to the surface of the separator. "In the vicinity of the surface" as described herein denotes a range of about 10% of the entire thickness from the surface of the separator. By improving the orientation of the plate-like particles so that they can be present in the porous layer (II) as described above, the porous layer (II) can exhibit the effect of suppressing thermal shrinkage more strongly. Further, it is possible to prevent more effectively the occurrence of an internal short circuit caused by lithium dendrites deposited on the electrode surface or projections of an active material on the electrode surface. It is possible to grasp the state of the plate-like particles in the porous layer (II) by observing the cross section of the separator with an SEM.

Further, when using the plate-like particles as the filler having a heat-resistant temperature of 150° C. or higher, it is preferable that the plate-like particles are stacked in the thickness direction through their plane surfaces in the porous layer (II) (as long as the filler particles are stacked in the thickness direction through a wide surface forming a plane, the upper and lower particles can be horizontally misaligned from each other) and the number of the filler particles stacked is preferably 5 or more, and more preferably 10 or more. When the plate-like filler is present in the porous layer (II) of the separator in such a manner, the strength, for example, the piercing strength of the separator can be enhanced. The piercing strength can be measured by a measuring method described later. However, when the number of the plate-like filler particles stacked in the porous layer (II) is too large, it leads to an increase in the thickness of the porous layer (II) and by extension the thickness of the separator, and may cause a decline in the energy density of the electrochemical device. For this reason, the number of the plate-like filler particles stacked in the porous layer (II) is preferably 50 or less, and more preferably 20 or less. The number of the plate-like filler particles stacked in the porous layer (II) can be measured by a method employed in Examples described later.

To ensure the shape stability of the separator and to integrate the porous layers (I) and (II) with each other, it is preferable to include an organic binder in the porous layer (II). Examples of organic binders include an ethylene-vinyl acetate copolymer (EVA; having 20 to 35 mol % of a structural unit derived from vinyl acetate), ethylene-acrylic acid copolymers such as an ethylene-ethyl acrylate copolymer, fluoro-rubber, styrene-butadiene rubber (SBR), carboxymethyl cellulose (CMC), hydroxyethyl cellulose (HEC), polyvinyl alcohol (PVA), polyvinyl butyral (PVB), polyvinyl pyrrolidone (PVP), a crosslinked acrylic resin, polyurethane, and an epoxy resin. In particular, a heat-resistant binder having a heat-resistant temperature of 150° C. or higher can be used preferably. One of the above-mentioned materials can be used alone, or alternatively two or more of the materials can be used together for the organic binder.

Among the organic binders mentioned above, highly flexible binders such as EVA, the ethylene-acrylic acid copolymer, the fluoro-rubber, and the SBR are preferable. Specific examples of the highly flexible organic binders include the following: EVA, "EVAFLEX series" manufactured by DU PONT-MITSUI POLYCHEMICALS CO., LTD.; EVA manufactured by NIPPON UNICAR CO., LTD.; an ethylene-acrylic acid copolymer, "EVAFLEX-EEA series" manufactured by DU PONT-MITSUI POLYCHEMICALS CO., LTD.; fluoro-rubber, "DAI-EL LATEX series" manufactured by DAIKIN INDUSTRIES, Ltd.; SBR, "TRD-2001" manufactured by JSR Corporation; and SBR, "EM-400B" manufactured by ZEON CORPORATION.

When using any of the organic binders in the porous layer (II), it may be dissolved in a solvent for a composition for forming the porous layer (II) (described later) or may be used in the form of an emulsion in which the organic binder is dispersed.

Further, to ensure the shape stability and flexibility of the separator, a fibrous material or the like can be mixed with the filler in the porous layer (II). Materials used for the fibrous material are not particularly limited as long as they have a heat-resistant temperature of 150° C. or higher are electrically insulative, and are stable electrochemically and in the electrolyte (described later in detail) or solvents used in producing the separator. The "fibrous material" as described herein has an aspect ratio [longitudinal length/width (diameter) in a direction crossing the longitudinal direction] of 4 or more, and the aspect ratio is preferably 10 or more.

Specific examples of components of the fibrous material include; resins such as celluloses and modifications thereof (carboxy methyl cellulose (CMC), hydroxypropylcellulose (HPC) and the like), polyolefins (polypropylene (PP), a propylene copolymer and the like), polyesters (polyethylene terephthalate (PET), polyethylene naphthalate (PEN), polybutylene terephthalate (PBT) and the like), polyacrylonitrile (PAN), aramid, polyamide imide and polyimide; and inorganic oxides such as glass, alumina, zirconia and silica. At least two of these components can be used together for the fibrous material. The fibrous material can contain a variety of additives as needed. For example, when the fibrous material is a resin, the fibrous material can contain an antioxidant or the like.

In the separator used in the electrochemical device of the present invention, a porous base can be used in the porous layer (II) to improve the ease of handling particularly when the porous layers (I) and (II) are not integrated with each other and the porous layer (II) is utilized as an independent film. The porous base is formed of a sheet as a woven fabric, a nonwoven fabric (including paper) or the like of the fibrous material having a heat-resistant temperature of 150° C. or higher, and a commercially available nonwoven fabric or the like can be used as the base. It is preferable to include the filler having a heat-resistant temperature of 150° C. or higher in the pores of the porous base in the separator of this embodiment. The organic binder can be used for binding the porous base and the filler to each other.

The "heat resistance" of the porous base indicates that a dimensional change caused by softening or the like does not occur substantially, and is evaluated on the basis of whether or not an upper limit temperature (heat-resistant temperature) at which a change in the length of an object, namely, a rate of shrinkage (shrinkage rate) to the length at room temperature for the porous base, can be kept not to exceed 5% is sufficiently higher than the shutdown temperature of the separator. To improve the safety of the electrochemical device after a shutdown, it is desirable that the porous base has a heat-resistant temperature higher than the shutdown temperature by 20° C. or higher. More specifically, the heat-resistant temperature of the porous base is preferably 150° C. or higher, and more preferably 180° C. or higher.

When using the porous base in forming the porous layer (II), it is preferable that the filler having a heat-resistant temperature of 150° C. or higher is partially or entirely present in the pores of the porous base. The separator of this embodiment makes it possible to exhibit the effects of the filler more effectively.

Although the diameter of the fibrous material (including the fibrous material forming the porous base as well as other fibrous materials) is not particularly limited as long as it is equal to or smaller than the thickness of the porous layer (II), the preferred diameter is 0.01 to 5 µm, for example. When the diameter of the fibrous material is too large, entanglement of the fibrous material becomes insufficient. As a result, when a sheet is formed to provide a porous base, for example, the strength is degraded, causing difficulty in handling. When the diameter of the fibrous material is too small, the pores in the separator become too small, and the ionic permeability may be degraded to lower the load characteristics of the electrochemical device.

When using the fibrous material in the porous layer (II) (including the use of the fibrous material in the form of a porous base), the content of the fibrous material is in the range of preferably 10 vol % to 90 vol %, and more preferably 20 vol % to 80 vol % of the entire components of the porous layer (II). The fibrous material is present in the porous layer (II) in a state where its long axis (axis in the longitudinal direction) has an angle of preferably 30° or less, and more preferably 20° or less in average with respect to the surface of the separator, for example.

The separator included in the electrochemical device of the present invention has a pore size of preferably 0.025 µm or more, and more preferably 0.03 µm or more in view of having favorable electrical characteristics. When the pore size of the separator is too large, the strength of he separator may decline. For this reason, the pore size is 0.07 µm or less, and preferably 0.04 µm or less. The pore size of the separator as described herein is a bubble point pore size (the largest pore size), which is calculated from the following formula with the use of a bubble point value P (Pa) measured with, for example, a "CFE-1500AEX Palm Porosimeter" manufactured by Porous Materials, Inc. by the method according to JIS K 3832.

$$d = (K4\gamma \cos \theta)/P$$

where d is a bubble point pore size (µm), $\gamma$ is a surface tension (mN/m), $\theta$ is a contact angle (°), and K is a capillary constant.

To adjust the pore size of the separator used in the present invention in the manner as described above, it is possible to employ a method of heating the separator at a temperature close to the melting point of the material of the separator while adjusting the temperature and the retentively of the separator. Consequently, the pore size of the separator can be adjusted to an appropriate value.

The thickness of the separator used in the present invention is preferably 6 µm or more, and more preferably 10 µm or more in view of separating the positive electrode and the negative electrode from each other with certainty. On the other hand, when the thickness of the separator is too large, it may cause a decline in the energy density of the electrochemical device. For this reason, the thickness of the separator is preferably 50 µm or less, and more preferably 30 µm or less.

The ratio of T1 to T2 (T1/T2) is in the range of preferably 1 to 10, and more preferably 2 to 5, where T1 (µm) is the thickness of the porous layer (I) and T2 (µm) is the thickness of the porous layer (II) constituting the separator. Even when the ratio of the porous layer (I) to the porous layer (II) in thickness is increased to reduce the thickness of the porous layer (II), not only can the shutdown function be ensured favorably but also the occurrence of a short circuit caused by thermal shrinkage of the separator can be prevented highly in the separator used in the present invention. When the separator includes a plurality of the porous layers (I), T1 represents the total thickness of the porous layers (I). Further, when the separator includes a plurality of the porous layers (II), T2 represents the total thickness of the porous layers (II).

Specifically, the thickness T1 of the porous layer (I) (the total thickness when the separator has a plurality of the porous layers (I)) is preferably in the range of 5 µm to 30 µm. The thickness T2 of the porous layer (II) (the total thickness when the separator has a plurality of the porous layers (II)) is in the range of preferably 1 µm to 20 µm, more preferably 2 µm to 10 µm, and still more preferably 4 µm to 6 µm. When the thickness of the porous layer (I) is too small, it may lead to deterioration of the shutdown function. On the other hand, when the thickness is too large, it may not only lead to a decline in the energy density of the electrochemical device but also an increase in thermal shrinkage force, so that the effect of suppressing thermal shrinkage of the separator as a whole may weaken when the porous layers (I) and (II) are integrated with each other to form the separator. Further, when the thickness of the porous layer (II) is too small, the effect of suppressing the occurrence of a short circuit caused by thermal shrinkage of the separator may weaken. On the other hand, when the thickness of the porous layer (II) is too large, it leads to an increase in the thickness of the separator as a whole.

To improve the ion permeability by ensuring the retention of the electrolyte, the porosity of the separator as a whole is preferably 30% or more in a dry state. On the other hand, in view of ensuring the strength of the separator and preventing an internal short circuit, the porosity of the separator is preferably 70% or less in a dry state. The porosity P (%) of the separator can be calculated from the thickness of the separator, the mass per unit area of the separator, and the densities of the components of the separator by obtaining a summation for each component i with the following formula (1).

$$P = 100 - (\Sigma a_i/\rho_i) \times (m/t) \quad (1)$$

where $a_i$ is the percentage of each component i by mass, $\rho_i$ is the density of each component i (g/cm$^3$), m is the mass per unit area (g/cm$^2$) of the separator, and t is the thickness (cm) of the separator.

The porosity P (%) of the porous layer (I) can also be determined from the formula (1), where m is the mass per unit area (g/cm$^2$) of the porous layer (I) and t is the thickness (cm) of the porous layer (I). The porosity of the porous layer (I) determined in this way is preferably 30 to 70%.

Further, the porosity P (%) of the porous layer (II) can also be determined from the formula (I), where m is the mass per unit area (g/cm$^2$) of the porous layer (II) and t is the thickness (cm) of the porous layer (II). The porosity of the porous layer (II) determined in this way is preferably 20 to 60%.

It is desirable that the separator used in the present invention has a Gurley value (air permeability) of 10 to 300 sec. The Gurley value is obtained by a method according to JIS P 8117 and expressed as the length of time (seconds) it takes for 100 ml air to pass through a membrane at a pressure of 0.879 g/mm$^2$. If the air permeability is too large, the ion permeability can be reduced. On the other hand, if the air permeability is too small, the strength of the separator can be reduced. Furthermore, it is desirable that the separator has a strength of 50 g or more, the strength being a piercing strength obtained using a needle having a diameter of 1 mm. When the piercing strength is too small, a short circuit may occur as a result of the separator being penetrated by lithium dendrites when the dendrites are formed. By adopting the separator configuration according to he present invention as described above, the separator can have the air permeability and piercing strength as described above.

The shutdown characteristics of the electrochemical device of the present invention that includes the separator as configured in the above-described manner can be determined from, for example, a change in internal resistance of the electrochemical device with temperature. Specifically, an electrochemical device is placed in a constant temperature bath, and a temperature at which the internal resistance of the electrochemical device rises is obtained by increasing the temperature from room temperature at a rate of 1° C. In this case, the internal resistance of the electrochemical device at 150° C. preferably is 5 times or more the internal resistance at room temperature, and more preferably 10 times or more. These characteristics can be ensured with the use of the separator having the above-described configuration.

It is preferable that the separator included in the electrochemical device of the present invention has a thermal shrinkage rate of 5% or less at 150° C. The separator having such a characteristic hardly shrinks even when the temperature inside the electrochemical device rises to about 150° C. Thus, it is possible to prevent a short circuit caused by contact between the positive electrode and the negative electrode with certainty, whereby the safety of the electrochemical device at high temperatures can be improved further. By adopting this configuration, the separator can have the thermal shrinkage rate as described above.

When the porous layers (I) and (II) are integrated with each other to form the separator, the thermal shrinkage rate as described herein refers to the shrinkage rate of the separator as a whole. When the porous layers (I) and (II) are independent from each other, the thermal shrinkage rate refers to the shrinkage rate of the porous layer (I) or (II), which ever is smaller. Further, as will be described later, the porous layer (I) and/or the porous layer (II) can be integrated with an electrode. In this case, the thermal shrinkage rate refers to one measured in a state where the porous layer (I) and/or the porous layer (II) is integrated with an electrode.

The term "thermal shrinkage rate at 150° C." refers to a rate of decrease in dimension expressed in percentage that is determined as follows. A separator or the porous layers (I) and (II) are placed in a constant temperature bath (when the porous layers are integrated with an electrode, they are placed in the constant temperature bath with the electrode), the temperature is increased to 150° C., at which the separator or the porous layers (I) and (II) are left for 3 hours, and after that, the separator or the porous layers (I) and (II) are taken out. Then, the dimensions of the separator or the porous layers (I) and (II) are compared before and after placing the separator or the porous layers (I) and (II) in the constant temperature bath.

For example, it is possible to adopt the following method (a) or (b) as the method for producing the separator included in the electrochemical device of the present invention.

In the production method (a), a composition (e.g., a liquid composition such as a slurry) for forming the porous layer (II) containing the filler having a heat-resistant temperature of 150° C. or higher is applied to a porous base, followed by drying at a certain temperature to form the porous layer (II). Then, the porous layer (II) and the porous layer (I) composed of a microporous film composed predominantly of the resin (A) are stacked on top of each other, thus producing a single separator. In this case, the porous layers (I) and (II) may be integrated with each other. Also, they each may be an independent film but function together as a single separator by being stacked on top of each other within an electrochemical device as a result of assembling the electrochemical device.

To integrate the porous layers (I) and (II) with each other, it is possible to adopt, for example, a method such as stacking one of the porous layers (I) and (II) on top of the other and bonding them together by roll pressing or the like.

Specific examples of the porous base used in the above case include porous sheets such as fabrics of at least one of fibrous materials containing any of the materials listed above as its component and unwoven fabrics having a structure in which the fibrous materials are intertwined with each other. More specifically, nonwoven fabrics such as paper, a PP nonwoven fabric, a polyester nonwoven fabric (a PET nonwoven fabric, a PEN nonwoven fabric, a PBT nonwoven fabric and the like), and a PAN nonwoven fabric can be used as the porous base.

In addition to the filler having a heat-resistant temperature of 150° C. or higher, the composition for forming the porous layer (II) contains an organic binder and the like as needed. The composition is prepared by dispersing these components into a solvent (including a dispersion medium, which is true in the following). It is also possible to dissolve the organic binder in the solvent. Any solvent in which the filler and the like can be dispersed uniformly as well as the organic binder can be dissolved or dispersed uniformly can be used for the composition for forming the porous layer (II), and general organic solvents including aromatic hydrocarbons such as toluene, furans such as tetrahydrofuran, and ketones such as methyl ethyl ketone and methyl isobutyl ketone, can be used preferably. To these solvents, alcohols (e.g., ethylene glycol, propylene glycol) or a variety of propylene oxide glycol ethers such as monomethyl acetate may be added as needed for the purpose of controlling interfacial tension. Further, when the organic binder is water-soluble or using the organic binder in the form of an emulsion, water may be used as the solvent. Also in this case, alcohols (such as methyl alcohol, ethyl alcohol, isopropyl alcohol, and ethylene glycol) may be added to the solvent as needed to control the interfacial tension.

The content of solids including the filler having a heat-resistant temperature of 150° C. or higher and the organic binder in the composition for forming the porous layer (II) is preferably 10 to 80 mass %, for example.

When the aperture diameter of the pores in the porous base is relatively large, for example, when the aperture diameter is 5 μm or more, this often could result in a short circuit in the electrochemical device. Therefore, in this case, it is preferable that structurally the filler having a heat-resistant temperature of 150° C. or higher and the like are partially or entirely present in the pores of the porous base as described above. In order to allow the filler and the like to be present in the pores of the porous base, the following steps may be used, for example: applying the composition for forming the porous layer (II) containing the filler and the like to the porous base; and removing an extra composition through a certain gap, followed by drying.

To improve the orientation of the plate-like filler in the porous layer (II) in the manner as described above, the composition for forming the porous layer (II) containing the plate-like filler may be subjected to shearing or a magnetic field after applying the composition to the porous base to impregnate the porous base with the composition. For example, as described above, it is possible to subject the composition for forming the porous layer (II) containing the plate-like filler to shearing after applying the composition to the porous base through a certain gap.

In order to take advantage of the effects obtained from the filler and other components of the porous layer (II) more effectively, these components may be distributed unevenly such that they are gathered in layers in parallel or substantially parallel with the surface of the separator.

On the other hand, in the separator production method (b), a fibrous material is further included in the composition for forming the porous layer (II) as needed, and the composition is applied to a base such as a film or metal foil and dried at a certain temperature. After being dried at a certain temperature, the dried composition is removed from the substrate as needed. Consequently, a porous film as the porous layer (II) can be formed.

Also in the production method (b), the porous layer (I) composed of a microporous film composed predominantly of the resin (A) and the porous layer (II) containing the filler as the main component may be independent from each other or they may be integrated with each other as with the case of the production method (a). In addition to bonding the separately-formed porous layers (I) and (II) together by roll pressing or the like, it is possible to adopt the following method to integrate the porous layers (I) and (II) with each other. Instead of using the above-described base, the composition for forming the porous layer (II) is applied onto the surface of the porous layer (I) and dried to form the porous layer (II) directly on the surface of the porous layer (I).

Further, by rising the production method (b), the porous layer (II) may be formed on the surface of an electrode forming the electrochemical device to have a structure in which the separator and the electrode are integrated with each other.

Irrespective of adopting the production method (a) or (b), the porous layer (I) may be integrated with at least one of the positive electrode and the negative electrode. To integrate the porous layer (I) and an electrode with each other, it is possible to adopt a method of stacking a microporous film as the porous layer (I) and the electrode on top of each other and bonding them together by roll pressing. Moreover, by using the production method (b), the porous layer (II) may be formed on the surface of the positive electrode and a microporous film to be the porous layer (I) may be bonded to the surface of the negative electrode to integrate the porous layers with the electrodes, respectively. The porous layers (I) and (II) produced by the production method (a) or (b) may be integrated with each other to form a separator, and the separator may be bonded to the surface of one of the positive electrode and the negative electrode to integrate them. To integrate the electrode and the separator produced by integrating the porous layers (I) and (II) with each other by bonding the separator to the surface of the electrode, it is possible to adopt a method of stacking the separator and the electrode on top of each other and bonding them together by roll pressing.

The number of each of the porous layers (I) and (II) does not have to be one and the separator may include a plurality of the porous layers (I) and a plurality of the porous layers (II). For example, the porous layers (I) may be disposed on both surfaces of the porous layer (II) or the porous layers (II) may be disposed on both surfaces of the porous layer (I). However, the thickness of the separator increases as the number of the porous layers increases. This may lead to, for example, an increase in the internal resistance of the electrochemical device and a decline in the energy density of the electrochemical device. For this reason, an excessive increase in the number of the porous layers is not preferable, and the total number of the porous layers (I) and (II) in the separator is preferably 5 or less.

Further, as described above, in addition to forming a separator as an independent film by integrating the porous layers (I) and (II) with each other, the following approach may also be taken. The porous layers (I) and (II) are used as independent components and they are stacked on top of each other in an electrochemical device when the electrochemical device is assembled, thus functioning as a separator interposed between the positive electrode and the negative electrode. Furthermore, because the porous layers (I) and (II) do not have to be in contact with each other, some other layer, for example, a layer of a fibrous material forming a porous base may be interposed between the porous layers (I) and (II).

The intended use of the electrochemical device of the present invention is not particularly limited. The electrochemical device can be suitably used in a lithium primary battery and a super capacitor in addition to a lithium secondary battery using a nonaqueous electrolyte, in particular any application requiring safety in the event of being overcharged and at high temperatures.

Although a solution prepared by dissolving a lithium salt in an organic solvent is used as the nonaqueous electrolyte included in the electrochemical device of the present invention, the solution may further contain vinyl ethylene carbonate or a derivate thereof, or a dinitrile compound or acid anhydride as an additive. The additive contained in the nonaqueous electrolyte acts on the surface of the positive electrode or the negative electrode to suppress a reaction between the nonaqueous electrolyte and the electrode, whereby improving the safety and high-temperature storability of the battery.

Vinyl ethylene carbonate or a derivative thereof and a dinitrile compound can be used in combination. Also, vinyl ethylene carbonate or a derivative thereof and acid anhydride can be used in combination. The combined use of these additives further improves the high-temperature storability of the battery.

As the dinitrile compound, for example, any compound expressed by the general formula NC—R—CN (where R is a straight or branched hydrocarbon chain having a carbon number of 1 to 10) is preferable. More preferably, R is a straight or branched alkylene chain having a carbon number of 1 to 10.

Specific examples of the dinitrile compounds expressed by the above general formula include: malononitrile, succinonitrile, glutaronitrile, adiponitrile, 1,4-dicyanopentan, 1,5-dicyanopentan, 1,6-dicyanohexane, 1,7-dicyanoheptane, 2,6-dicyanoheptane, 1,8-dicyanooctane, 2,7-dicyanooctane, 1,9-dicyanononane, 2,8-dicyanononane, 1,10-dicyanodecane, 1,6-dicyanodecane, and 2,4-dimethyl glutaronitrile.

In view of ensuring the effect obtained from the use of the dinitrile compound more effectively, the content of the dinitrile compound in the nonaqueous electrolyte (the amount of the dinitrile compound mixed with the nonaqueous electrolyte) is preferably 0.01 mass % or more, and more preferably 0.05 mass % or more. However, when the amount of the compound is too large, the charge-discharge cycle characteristics tend to be degraded. For this reason, the content of the compound in the nonaqueous electrolyte (the amount of the compound mixed with the nonaqueous electrolyte) is preferably 1 mass % or less, and more preferably 0.5 mass % or less.

Examples of the acid anhydride include mellitic anhydride, malonic anhydride, maleic anhydride, butyric anhydride, propionic anhydride, pulvinic anhydride, phthalonic anhydride, phthalic anhydride, pyromellitic anhydride, lactic anhydride, naphthalic anhydride, toluic anhydride, thiobenzoic anhydride, diphenic anhydride, citraconic anhydride, diglycolamidic anhydride, acetic anhydride, succinic anhydride, cinnamic anhydride, glutaric anhydride, glutaconic anhydride, valeric anhydride, itaconic anhydride, isobutyric anhydride, isovaleric anhydride, benzoic anhydride, and sulfonic anhydride.

A compound expressed by the following general formula (1) is used preferably as the sulfonic anhydride.

[CHEMICAL FORMULA 1]

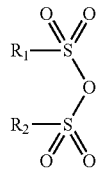

(1)

Where $R_1$ and $R_2$ are each an independent organic residue having a carbon number in the range of 1 to 10. Preferably, $R_1$ and $R_2$ are each an alkyl group having a carbon number in the range of 1 to 10 whose hydrogen atoms may be partially or entirely substituted with fluorine atoms, and specific examples of which include a methyl group, an ethyl group, a propyl group, an isopropyl group, a butyl group, and an isobutyl group. Further, $R_1$ and $R_2$ may be each an aromatic group having a carbon number in the range of 1 to 10. It is preferable that $R_1$ and $R_2$ each have a carbon number in the range of 2 to 6. Sulfonic anhydride in which $R_1$ and $R_2$ each have a carbon number larger than 10 is less dissolvable in the nonaqueous electrolyte, so that its effect cannot be easily expressed.

The sulfonic anhydride is either a symmetrical anhydride, an asymmetrical anhydride derived from two different acids (also referred to as a mixed anhydride) or acid anhydride ester-acid anhydride including partial ester as an acid residue. Specific examples of which include ethane methane sulfonic acid anhydride, propanesulfonic anhydride, butanesulfonic anhydride, pentanesulfonic anhydride, hexanesulfonic anhydride, heptanesulfonic anhydride, butane ethane sulfonic acid anhydride, butane hexane sulfonic acid anhydride, and benzene sulfonic acid anhydride. Among these, propanesulfonic anhydride, butanesulfonic anhydride, butane pentane sulfonic acid anhydride, pentanesulfonic anhydride, and hexanesulfonic anhydride are particularly preferred.

The acid anhydride may be used alone or in combination of two or more.

In view of ensuring the effect obtained from the use of the acid anhydride more effectively, the content of the acid anhydride in the nonaqueous electrolyte (i.e., the amount of the acid anhydride mixed with the nonaqueous electrolyte) is preferably 0.5 mass % or more, and more preferably 1.0 mass % or more. However, when the acid anhydride is added too much, the electrical characteristics tend to be degraded. For this reason, the content of the acid anhydride in the nonaqueous electrolyte (the amount of the acid anhydride mixed with the nonaqueous electrolyte) is preferably 5 mass % or less, and more preferably 4 mass % or less.

Examples of derivatives of the vinyl ethylene carbonate include 4-methyl-4-vinyl ethylene carbonate, 4-ethyl-4-vinyl ethylene carbonate, 4-n-propyl-4-vinyl ethylene carbonate, 5-methyl-4-vinyl ethylene carbonate, 4,4-divinyl ethylene carbonate, and 4,5-divinyl ethylene carbonate.

In view of ensuring the effect obtained from the use of the vinyl ethylene carbonate or a derivative thereof more effectively, the content of the vinyl ethylene carbonate or a derivative thereof in the nonaqueous electrolyte (i.e., the amount of the vinyl ethylene carbonate or a derivative thereof mixed with the nonaqueous electrolyte) is preferably 0.5 mass % or more, and more preferably 1.0 mass % or more. However, when the vinyl ethylene carbonate or a derivative thereof is added too much, the electrical characteristics tend to be degraded. For this reason, the content of the vinyl ethylene carbonate or a derivative thereof in the nonaqueous electrolyte (i.e., the amount of the vinyl ethylene carbonate or a derivative thereof mixed with the nonaqueous electrolyte) is preferably 5 mass % or less, and more preferably 4 mass % or less.

The lithium salt used in the nonaqueous electrolyte is not particularly limited as long as it dissociates in the solvent to produce a $Li^+$ ion and is less likely to cause a side reaction such as decomposition in the working voltage range of a battery. For example, it is possible to use inorganic lithium salts such as $LiClO_4$, $LiPF_6$, $LiBF_4$, $LiAsF_6$, and $LiSbF_6$; and organic lithium salts such as $TiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($2 \leq n \leq 5$), and $LiN(RfOSO_2)_2$ (where Rf is a fluoroalkyl group).

The organic solvent used for the nonaqueous electrolyte is not particularly limited as long as it dissolves the lithium salt and does not cause a side reaction such as decomposition in the working voltage range of the electrochemical device. Examples of the organic solvent include: cyclic carbonates such as an ethylene carbonate, a propylene carbonate, a butylene carbonate, and a vinylene carbonate; chain carbonates such as a dimethyl carbonate, a diethyl carbonate, and a methyl ethyl carbonate; chain esters such as methyl propionate; cyclic esters such as γ-butyrolactone; chain ethers such as dimethoxyethane, diethyl ether, 1,3-dioxolane, diglyme, triglyme, and tetraglyme; cyclic ethers such as dioxane, tetrahydrofuran, and 2-methyltetrahydrofuran; nitriles such as acetonitrile, propionitrile, and methoxypropionitrile; and sulfurous esters such as ethylene glycol sulfite. The above examples of the organic solvent may be used in combinations of two or more. To further improve the characteristics of the battery, it is desirable to use combinations of solvents, such as a mixed solvent of an ethylene carbonate and a chain carbonate, from which high electric conductivity can be obtained.

Further, for the purpose of improving characteristics such as safety, charge-discharge cycle characteristics, and high-temperature storability, other additives such as vinylene carbonate, 1,3-propane sultone, diphenyl disulfide, biphenyl, and fluorobenzene can be added to the nonaqueous electrolyte as needed. It is possible to further improve the high-temperature storability of the battery when these additives are used in combination.

The concentration of the lithium salt in the nonaqueous electrolyte is preferably 0.5 to 1.5 mol/L, and more preferably 0.9 to 1.25 mol/L.

The negative electrode included in the electrochemical device of the present invention contains graphite having an R value($I_{1360}/I_{1580}$) in the range of 0.1 to 0.5 and $d_{002}$ of 0.338 nm or less as a negative electrode active material, where the R value is a ratio of a peak intensity at 1360 cm$^{-1}$ to a peak intensity at 1580 cm$^{-1}$ in an argon ion laser Raman spectrum and the $d_{002}$ is a lattice spacing between 002 planes. The ratio of the graphite to the negative electrode active material is 30 mass % or more. As a result of using the negative electrode containing such a negative electrode active material, it is possible to maintain excellent charge characteristics at low temperatures even when using a nonaqueous electrolyte containing an additive such as vinyl ethylene carbonate or a derivative thereof, a dinitrile compound or acid anhydride, which is likely to reduce the reactivity of the electrochemical device at low temperatures.

The R value can be determined from a Raman spectrum, which is obtained by using an argon laser (e.g., "T-5400" manufactured by Ramanaor Inc., (laser power: 1 mW)) with a wavelength of 514.5 nm.

Examples of the graphite whose R value and $d_{002}$ satisfy the above-mentioned values include graphite whose surface is covered with a low crystalline carbon material. Such graphite can be obtained as follows. Natural or artificial graphite having $d_{002}$ of 0.338 nm or less and adjusted to be spherical is used as a base material, and the surface of the base material is coated with an organic compound. After baking the graphite at 800 to 1500° C., the graphite is pulverized and then sized through a sieve. Examples of organic compounds with which the base material can be coated include; aromatic hydrocarbons; tars or pitches obtained from polycondesation of aromatic hydrocarbons under heated and pressure conditions; and tars, pitches and asphalts having an aromatic hydrocarbon mixture as the main component. To cover the base material with the organic compound, it is possible to adopt a method such as impregnating or mixing the inorganic material with the base material. Further, it is also possible to produce the graphite whose R value and $d_{002}$ satisfy the above-mentioned values by a vapor phase method by thermally decomposing a hydrocarbon gas such as propane or acetylene to carbonize the gas and depositing it on the surface of graphite having $d_{002}$ of 0.338 nm or less.

It is preferable that the graphite whose R value and $d_{002}$ satisfy the above-mentioned values has an average particle size $D_{50}$ in the range of 10 μm to 30 μm. The average particle size $D_{50}$ can be measured by the same device as the one used to measure the number-average particle size of the filler used in the separator. Furthermore, it is preferable that the specific surface area of the graphite is in the range of 1.0 m$^2$/g to 5.0 m$^2$/g.

The graphite whose surface is coated with a low crystalline carbon material such as the one described above has a rough surface. Thus, when a negative electrode containing such graphite as an active material is rolled, the separator may be compressed by the negative electrode depending on the strength of the separator, and the distance between the electrodes becomes small. This may lead to a decline in capacity at a charge-discharge cycle without the occurrence of a short circuit, and the reliability may be compromised. However, in the present invention, it is possible to prevent such a problem because the porous layer (II) of the separator improves the strength of the separator.

Although the graphite whose R value and $d_{002}$ satisfy the above-mentioned values can be used as the only negative electrode active material, other negative electrode active materials can also be used in combination with the graphite. Examples of such negative electrode active materials include carbon materials capable of intercalating and deintercalating a Li ion such as graphite having an R value of less than 0.1 (graphite having high surface crystallinity), thermally decomposed carbons, cokes, glassy carbons, calcined organic polymer compounds, mesocarbon microbeads (MCMB), and carbon fibers. Even when any of these carbon materials is used in combination with the graphite, it is desirable that the ratio of the graphite having an R value of 0.1 to 0.5 and $d_{002}$ of 0.338 nm or less to the entire negative electrode active material used in the negative electrode is 30 mass % or more, as described above. To further improve the characteristics at low temperatures, the ratio of the graphite to the entire negative electrode active material is 50 mass % or more, more preferably 70 mass % or more, and particularly preferably 80 mass % or more.

It is possible to use a negative electrode produced by forming, on one of or both surfaces of a current collector, a negative electrode mixture layer made from a negative electrode mixture containing the negative electrode active material and a binder, and a conductive assistant as needed. Such a negative electrode can be produced as follows. For example, a negative electrode mixture-containing composition in the form of a slurry or paste prepared by dispersing the negative electrode mixture in a solvent is applied to one of or both surfaces of a current collector. After being dried, the current collector is pressed as needed to adjust the thickness of the negative electrode mixture layer. The negative electrode used in the present invention can also be produced by methods other than the one described above. The thickness of the negative electrode mixture layer is preferably 10 to 100 μm per side of the current collector.

Fluorocarbon resins such as polyvinylidene fluoride (PVDF), stylene-butadiene rubber (SBR), carboxymethyl cellulose (CMC) and the like can be used as a binder for the negative electrode. Further, carbon materials such as carbon black can be used as a conductive assistant for the negative electrode.

Although a foil, a punched metal, a mesh, an expanded metal and the like made of copper or nickel can be used as the current collector used in the negative electrode, a copper foil is used generally. When the thickness of the negative electrode as a whole is reduced to obtain a battery having a high energy density, the upper limit of the thickness of the negative electrode current collector is preferably 30 μm and the lower limit of the thickness is desirably 5 μm.

A lead portion of the negative electrode is generally provided in the following manner. A part of the current collector remains exposed without forming the negative electrode mixture layer when producing the negative electrode, and this exposed portion can serve as the lead portion. However, the lead portion does not need to be integrated with the current collector from the beginning and may be provided by connecting a copper foil or the like to the current collector afterward.

Due to the use of the negative electrode active material, the surface of the negative electrode mixture layer of the negative electrode used in the present invention becomes relatively rough as illustrated by its arithmetic mean roughness (Ra) of 0.7 to 1.2 μm. However, as described above, the electrochemical device of the present invention uses the separator having a large strength. Thus, it is possible to improve the productivity by preventing the occurrence of a small short circuit caused by projections on the surface of the negative electrode penetrating the separator.

The arithmetic mean roughness (Ra) of the surface of the negative electrode mixture layer of the negative electrode as described herein refers to an arithmetic mean roughness according to JIS B 0601. Specifically, it is a value determined by measuring a field of view of 1 mm×1 mm with a confocal scanning microscope ("Real-time Scanning Laser Microscope 1LM-21D" manufactured by Lasertec Corporation) at 512×512 pixels and determining an arithmetic mean of absolute values that are each obtained from an average line at each point.

As long as the electrochemical device of the present invention includes the separator, negative electrode, and nonaqueous electrolyte as described above, there is no particular limitation to other configuration/structure. Accordingly, a variety of configurations/structures employed by a variety of types of conventionally known electrochemical devices including a nonaqueous electrolyte (e.g., a lithium secondary battery, a lithium primary battery, and a super capacitor) can be applied to the electrochemical device of the present invention.

Hereinafter, the application of the electrochemical device of the present invention to a lithium secondary battery will be mainly described as an example. The lithium secondary battery may be in the form of a rectangular or circular cylinder and have an outer can made of steel or aluminum. Moreover, the lithium secondary battery may be a soft package battery using a metal-deposited laminated film as an outer package.

The lithium secondary battery preferably has a mechanism for discharging gas contained in the battery to the outside when the temperature is raised. As such a mechanism, a conventionally known mechanism can be used. When the battery has an outer can made of steel or aluminum, a metal cleavable vent that cracks at a certain pressure, a resin vent that tears at a certain pressure, or a rubber vent that becomes uncovered at a certain pressure can be used. In particular, the metal cleavable vent is preferred.

In the soft package battery, the joint is heat-sealed with the resin. Therefore, it is intrinsically difficult to have a structure that can resist high temperatures and high pressures when the temperature and the internal pressure of the battery are raised. Thus, even if there is no particular mechanism, the soft package battery can discharge the gas contained in the battery to the outside when the temperature is raised. That is, in the soft package battery, the sealed portion (heat-sealed portion) of the outer package functions as a mechanism for discharging the gas contained in the battery to the outside. Moreover, by narrowing the width of the sealed portion only in a specific region, the soft package battery also can discharge the gas contained in the battery to the outside when the temperature is raised. In other words, the specific region of the sealed portion functions as a mechanism for discharging the gas contained in the battery to the outside.

The positive electrode is not particularly limited as long as it has been used for a conventionally known lithium secondary battery, that is, it contains an active material capable of intercalating and deintercalating a Li ion. Examples of active materials include: lithium-containing transition metal oxides having a layered structure and expressed as $Li_{1+x}MO_2$ ($-0.1<x<0.1$, M: Co, Ni, Mn, Al, Mg, etc. The element M may be substituted with other metal elements other than Li up to 10 atomic %); lithium manganese oxides having a spinel structure expressed as $LiMn_2O_4$ or other formulas in which a part of the elements of $LiMn_2O_4$ is substituted with another element; and olivine-type compounds expressed as $LiMPO_4$ (M: Co, Ni, Mn, Fe, etc.). Specific examples of the lithium-containing transition metal oxides having a layered structure include $LiCoO_2$ and $LiNi_{1-x}Co_{x-y}Al_yO_2$ ($0.1 \leq x \leq 0.3$, $0.01 \leq y \leq 0.2$) in addition to oxides containing at least Co, Ni and Mn ($LiMn_{1/3}Ni_{1/3}Co_{1/3}O_2$, $LiMn_{5/12}Ni_{5/12}Co_{1/6}O_2$, $LiNi_{3/5}Mn_{1/5}Co_{1/5}O_2$, etc.). In particular, an active material containing 40% or more of Ni is preferable because the capacity of the battery can be increased. Further, O (oxygen atom) may be substituted with a fluorine atom or a sulfur atom up to 1 atomic %.

Carbon materials such as carbon black can be used as a conductive assistant for the positive electrode. Fluorocarbon resins such as PVDF can be used as a binder for the positive electrode. Using a positive electrode mixture in which these materials are mixed with active materials, a positive electrode mixture layer is formed on, for example, one of or both surfaces of a current collector.

The current collector of the positive electrode may be, for example, a metal foil, a punched metal, a mesh, an expanded metal or the like made of aluminum. In general, an aluminum foil with a thickness of 10 to 30 μm can be suitably used.

A lead portion of the positive electrode is generally provided in the following manner. A part of the current collector remains exposed without forming the positive electrode mixture layer when producing the positive electrode, and thus this exposed portion can serve as the lead portion. However, the lead portion does not need to be integrated with the current collector from the beginning and may be provided by connecting an aluminum foil or the like to the current collector afterward.

Electrodes may be in the form of a stacked electrode body formed by stacking the positive electrode and the negative electrode via the separator or in the form of a wound electrode body formed by winding the stacked electrodes. In the electrochemical device of the present invention, the porous layer (II) of the separator preferably faces the positive electrode so as to suppress oxidation degradation of the separator particularly when the electrochemical device is overcharged. The electrode body as described above needs to be formed such that the porous layer (I) of the separator faces the negative electrode.

Further, in the electrochemical device of the present invention, it is more preferable that the porous layer (I) of the separator is disposed to face the negative electrode. Although the details are not known, the effect resulting from a shutdown becomes more favorable when the separator is disposed such that the porous layer (I) at least faces the negative electrode than disposing the separator such that the porous layer (I) faces the positive electrode. This is because the resin (A) molten from the porous layer (I) at the time of a shutdown will be absorbed by the electrode mixture layer in a smaller proportion, so that the molten resin (A) is utilized more effectively in closing the pores of the separator.

Furthermore, when the electrochemical device includes a mechanism for reducing the internal pressure of the electrochemical device by discharging the gas contained in the electrochemical device to the outside at the time the internal pressure is raised due to the temperature rise, upon actuation of the mechanism, the nonaqueous electrolyte in the electrochemical device evaporates and the electrodes can be directly exposed to the air. This may occur while the electrochemical device is in the charged state. If the negative electrode comes into contact with the air (i.e., oxygen and moisture), the Li ion intercalated by the negative electrode or the lithium deposited on the surface of the negative electrode reacts with the air and may generate heat. Further, due to this generated heat, the temperature of the electrochemical device may increase and cause a thermal runaway reaction of the positive electrode active material. Consequently, the electrochemical device may generate heat abnormally.

However, in the case of the electrochemical device configured such that the porous layer (I) composed predominantly of the resin (A) faces the negative electrode, the resin (A) as the main component of the porous layer (I) melts at high temperatures and covers the surface of the negative electrode. Thus, it is possible to suppress a reaction between the negative electrode and the air caused by the actuation of the mechanism for discharging the gas contained in the electrochemical device to the outside. Consequently, the possibility of heat generation caused by the actuation of the mechanism for discharging the gas contained in the electrochemical device to the outside can be eliminated, whereby the electrochemical device can be maintained more safely. Further, as a result of the porous layer (II) facing the positive electrode, a reaction between the porous layer (I) and the positive electrode can be prevented.

For this reason, in the case of the separator including a plurality of the porous layers (I) composed predominantly of the resin (A) and a plurality of the porous layers (II), it is more preferable that the separator is configured such that the porous layers (II) face the positive electrode and the porous layers (I) face the negative electrode.

For example, the positive electrode having the positive electrode mixture layer and the negative electrode having the negative electrode mixture layer as described above can be produced in the following manner. A composition (slurry etc.) for forming the positive electrode mixture layer is prepared by dispersing the positive electrode mixture in a solvent such as N-methyl-2-pyrrolidone (NMP). A composition (slurry etc.) for forming the negative electrode mixture layer is prepared by dispersing the negative electrode mixture in a solvent such as NMP. These compositions are applied to the current collectors, and then dried. In this case, for example, a lithium secondary battery (electrochemical device) also can be configured using a laminated composite of the positive electrode and the porous layer (II) or a laminated composite of the negative electrode and the porous layer (II). The laminated composite of the positive electrode and the porous layer (II) is produced by applying the composition for forming the positive electrode mixture layer to the surface of the current collector, and applying the composition for forming the porous layer (II) before the previously applied composition is dried. The laminated composite of the negative electrode and the porous layer (II) is produced by applying the composition for forming the negative electrode mixture layer to the surface of the current collector, and applying the composition for forming the porous layer (II) before the previously applied composition is dried.

Figure 1B:
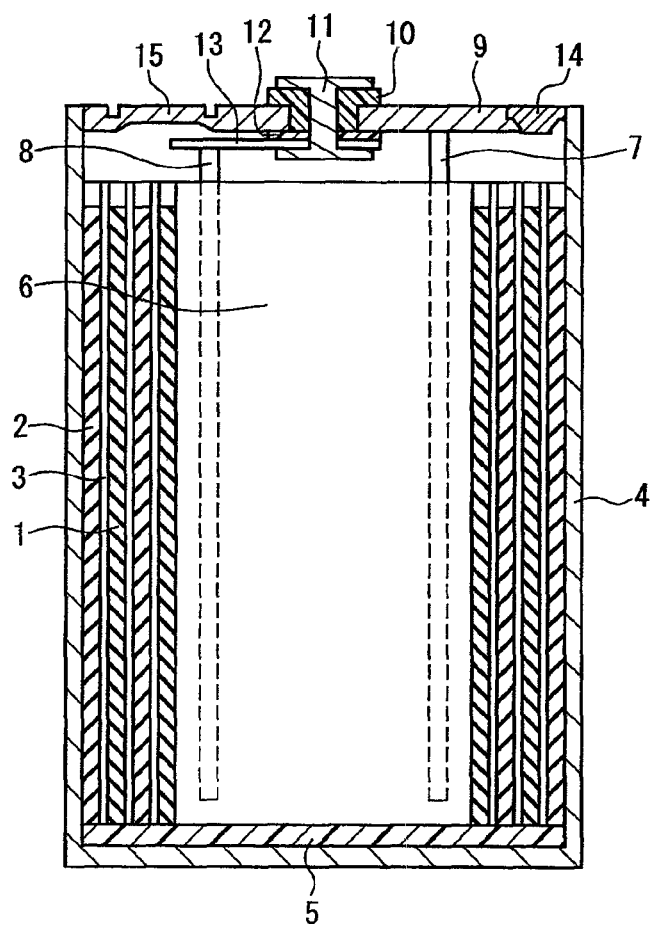
Figure 2:
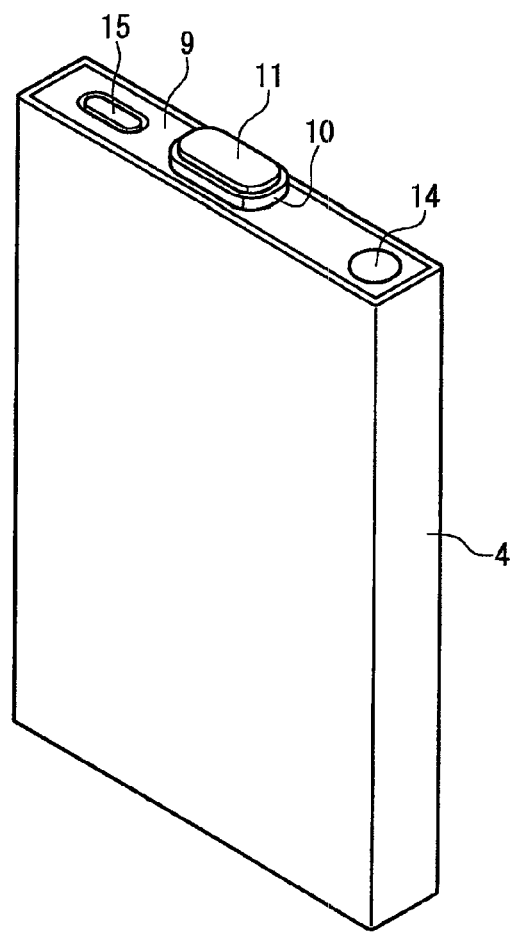
FIG. 2 is a schematic external view of the lithium secondary battery according to the present invention.

Hereinafter, a lithium secondary battery as one example of the electrochemical device of the present invention will be described with reference to the drawings. FIG. 1A is a schematic plan view of the lithium secondary battery according to the present invention and FIG. 1B is a schematic cross-sectional view of the battery shown in FIG. 1A. FIG. 2 is a schematic external view of the lithium secondary battery according to the present invention.

Now, the battery as shown in FIGS. 1A, 1B, and 2 will be described. The negative electrode 1 according to the present invention and the positive electrode 2 according to the present invention are wound via the separator 3 according to the present invention in a spiral fashion, and then pressed into a flat shape, thereby providing a wound electrode body 6. The wound electrode body 6, together with a nonaqueous electrolyte, is housed in a rectangular cylindrical outer can 4. For the sake of simplicity, FIG. 1B does not illustrate metal foils as current collectors of the negative electrode 1 and the positive electrode 2, a nonaqueous electrolyte, etc. Also, hatching lines indicating a cross section are not given to the center of the wound electrode body 6 and the separator 3.

The outer can 4 is made of an aluminum alloy, serves as an outer package of the battery, and is also used as a positive electrode terminal. An insulator 5 made of a polyethylene sheet is placed at the bottom of the outer can 4. A negative electrode lead 8 and a positive electrode lead 7 connected to the respective ends of the negative electrode 1 and the positive electrode 2 are drawn from the wound electrode body 6 including the negative electrode 1, the positive electrode 2, and the separator 3. A stainless steel terminal 11 is attached to a cover plate 9 via a polypropylene insulating packing 10. The cover plate 9 is made of an aluminum alloy and used to seal the opening of the outer can 4. A stainless steel lead plate 13 is attached to the terminal 11 via an insulator 12.

The cover plate 9 is inserted into the opening of the outer can 4, and the joint between them is welded to seal the opening of the outer can 4, so that the inside of the battery is hermetically sealed. Moreover, the cover plate 9 has an inlet 14 through which the nonaqueous electrolyte is injected. The inlet 14 is sealed with a sealing member by laser welding or the like. Thus, the sealing properties of the battery are ensured. For the sake of convenience, in the battery as shown in FIGS. 1A, 1B, and 2, the inlet 14 includes the sealing member as well as itself Further, the cover plate 9 has a cleavable vent 15 as a mechanism for discharging the gas contained in the battery to the outside at the time the internal pressure is raised due to a rise in temperature of the battery or the like.

In the lithium secondary battery shown in FIGS. 1A, 1B and 2, the positive electrode lead 7 is directly welded to the cover plate 9, so that the outer can 4 and the cover plate 9 can function as a positive terminal. Moreover, the negative electrode lead 8 is welded to the lead plate 13, and thus electrically connected to the terminal 11 via the lead plate 13, so that the terminal 11 can function as a negative terminal. However, the positive and negative electrodes may be reversed depending on the material of the outer can 4 or the like.

EXAMPLES

Hereinafter, the present invention will be described in detail based on examples. Note that the following examples do not limit the scope of the present invention.

First, examples in which dinitrile compounds were used as nonaqueous electrolyte additives will be described.

Example 1

<Production of Negative Electrode>

A water-based negative electrode mixture containing paste was prepared as follows. 98 parts by mass of a mixture (negative electrode active materials) prepared by mixing graphite having an average particle size $D_{50}$ of 18 μm, $d_{002}$ of 0.338 nm, an R value of 0.18 and a specific surface area of 3.2 m$^2$/g with graphite having an average particle size $D_{50}$ of 16 μm, $d_{002}$ of 0.336 nm, and an R value of 0.05 at a mass ratio of 85:15, 1.0 part by mass of an aqueous solution whose viscosity was adjusted in the range of 1500 to 5000 mPa·s and containing carboxymethyl cellulose at a concentration of 1 mass %, and 1.0 part by mass of styrene-butadiene rubber were mixed with each other in ion-exchange water having a specific conductance of 2.0×10$^5$ Ω/cm or more as a solvent.

The negative electrode mixture containing paste was intermittently applied to both surfaces of a current collector composed of a copper foil and having a thickness of 10 μm, which then was dried and calendered to adjust the thickness of the negative electrode mixture layers so that the negative electrode would have a total thickness of 142 μm. The arithmetic mean roughness (Ra) of the surface of each negative electrode mixture layer of the negative electrode was determined with a confocal scanning microscope and it was 0.75 μm.

Subsequently, this current collector was cut into a width of 45 mm, thus obtaining the negative electrode. Moreover, a lead portion was formed by welding a tab to the exposed portion of the current collector of the negative electrode.

<Production of Positive Electrode>

A positive electrode mixture containing paste was prepared as follows. 70 parts by mass of LiCoO$_2$ as a positive electrode active material, 15 parts by mass of LiNi$_{0.8}$Co$_{0.2}$O$_2$ as a positive electrode active material, 10 parts by mass of acetylene black as a conductive assistant, and 5 parts by mass of PVDF as a binder were mixed uniformly in NMP as a solvent. The paste was intermittently applied to both surfaces of an aluminum foil having a thickness of 15 μm as a current collector, which then was dried and calendered to adjust the thickness of the positive electrode mixture layers so that the positive electrode would have a total thickness of 150 μm. Subsequently, this current collector was cut into a width of 43 mm, thus obtaining the positive electrode. Moreover, a lead portion was formed by welding a tab to the exposed portion of the current collector of the negative electrode.

<Production of Separator>

100 g of an emulsion of SBR as an organic binder (solids content: 40 mass %) and 6000 g of water were put in a container and they were stirred at room temperature until the emulsion dispersed uniformly in the water. A boehmite powder (shape: platelike, average particle size: 1 μm, aspect ratio: 10) as the filler having a heat-resistant temperature of 150° C. or higher was added to the dispersion solution four times in total of 2000 g and was stirred with a disperser at 2800 rpm fur 5 hours to prepare a uniform slurry (a slurry for forming the porous layer (II), solids content: 25.3 mass %). Next, the slurry was applied to a polyethylene (PE) microporous film (porous layer (I), thickness: 12 μm, porosity: 40%, pore size: 0.033 μm, melting point: 135° C.) with a micro gravure coater, which was then dried to form the porous layer (II) having a thickness of 2.6 μm, thus obtaining the separator.

The mass per unit area of the porous layer (II) of the obtained separator was 3.4 g/m$^2$. Further, the piercing strength of the porous layer (II) of the separator was 3.9 N, the content of the plate-like boehmite in volume was 88 vol %, and the porosity of the porous layer (II) was 55%. Moreover, the pore size (bubble point pore size) of the separator measured by the method as described above was 0.033 μm.

The number of platelike boehmite particles stacked in the porous layer (II) was determined by using a cross section polisher by cutting the separator with an argon ion laser beam in a reduced pressure atmosphere and observing the cross section with an SEM. It was found that the number was 6 to 8. In each of the following examples, the number of stacked plate-like filler particles was measured by the same method.

<Assembly of Battery>

The positive electrode and the negative electrode obtained as described above were stacked with the separator obtained as described above being interposed therebetween such that the porous layer (I) faced the negative electrode and the porous layer (II) faced the positive electrode. Then, they were wound in a spiral fashion to form a wound electrode body. The obtained wound electrode body was pressed into a flat shape, and then was inserted into an aluminum outer can having a thickness of 6 mm, a height of 50 mm and a width of 34 mm. Next, in a solvent prepared by mixing ethylene carbonate and ethyl methyl carbonate at a volume ratio of 1:2, LiPF$_6$ was dissolved in a concentration of 1.2 mol/L. Further, 0.2 mass % of succinonitrile as a dinitrile compound was added to the solvent to prepare an electrolyte. The electrolyte was poured into the outer can, followed by sealing, thus producing a lithium secondary battery having the same configuration as the battery shown in FIGS. 1A, 1B and 2.

Example 2

A separator was produced in the same manner as in Example 1 by forming the porous layer (II) on a PE microporous film (porous layer (I)). The only exception was that the gap of the micro gravure coater was adjusted so that the porous layer (II) after being dried would have a thickness of 4.3 μm.

The mass per unit area of the porous layer (II) of the obtained separator was 6.0 g/m$^2$. Further, the piercing strength of the porous layer (II) of this separator was 3.9 N, the content of the plate-like boehmite in volume was 86 vol %, and the porosity of the porous layer (II) was 55%. Moreover, the pore size (bubble point pore size) of the separator measured by the method as described above was 0.033 μm. Further, the number of the plate-like boehmite particles stacked in the porous layer (II) was 12 to 16.

A lithium secondary battery was produced in the same manner as in Example 1 except that the above separator was used.

Example 3

A separator was produced in the same manner as in Example 1 by forming the porous layer (II) on a PE microporous film (porous layer (I)). The only exception was that the gap and pump discharge of the micro gravure coater was adjusted so that the porous layer (II) after being dried would have a thickness of 7.5 μm.

The mass per unit area of the porous layer (II) of the obtained separator was 9.8 g/m$^2$. Further, the piercing strength of the porous layer (II) of this separator was 4.0 N, the content of the plate-like boehmite in volume was 88 vol %, and the porosity of the porous layer (II) was 53%. Moreover, the pore size (bubble point pore size) of the separator measured by the method as described above was 0.033 μm. Further, the number of the plate-like boehmite particles stacked in the porous layer (II) was 22 to 28.

A lithium secondary battery was produced in the same manner as in Example 1 except that the above separator was used.

Example 4

A negative electrode was produced in the same manner as in Example 1 except that the mass ratio of the negative electrode active materials, i.e., the ratio of the graphite having an R value of 0.18 to the graphite having an R value of 0.05 was changed to 90:10. The obtained negative electrode had a total thickness of 144 μm after being calendered. The arithmetic mean roughness (Ra) of the surface of each negative electrode mixture layer was determined with the confocal scanning microscope and it was 0.9 μm.

A lithium secondary battery was produced in the same manner as in Example 1 except that the above negative electrode was used.

Example 5

A lithium secondary battery was produced in the same manner as in Example 1 except that the same negative electrode as the one produced in Example 4 and the same separator as the one produced in Example 2 were used.

Example 6

A lithium secondary battery was produced in the same manner as in Example 1 except that the same negative electrode as the one produced in Example 4 and the same separator as the one produced in Example 3 were used.

Example 7

A negative electrode was produced in the same manner as in Example 1 except that the same graphite as the one used in Example 1 having an R value of 0.18 was used as the only negative electrode active material. The obtained negative electrode had a total thickness of 145 μm after being calendered. The arithmetic mean roughness (Ra) of the surface of each negative electrode mixture layer was determined with the confocal scanning microscope and it was 1.1 μm.

A lithium secondary battery was produced in the same manner as in Example 1 except that the above negative electrode was used.

Example 8

A lithium secondary battery was produced in the same manner as in Example 1 except that the same negative electrode as the one produced in Example 7 and the same separator as the one produced in Example 2 were used.

Example 9

A lithium secondary battery was produced in the same manner as in Example 1 except that the same negative electrode as the one produced in Example 7 and the same separator as the one produced in Example 3 were used.

Example 10

A lithium secondary battery was produced in the same manner as in Example 1 except that $LiCoO_2$ was used as the only positive electrode active material.

Example 11

A lithium secondary battery was produced in the same manner as in Example 1 except that at the time of producing a wound electrode body a separator was disposed so that the porous layer (I) faced the positive electrode and the porous layer (II) faced the negative electrode.

Example 12

A lithium secondary battery was produced in the same manner as in Example 1 except that the following electrolyte was used. The electrolyte was produced by dissolving $LiPF_6$ at a concentration of 1.2 mol/L in a solvent prepared by mixing ethylene carbonate and ethyl methyl carbonate at a volume ratio of 1:2 and adding 0.2 mass % of succinonitrile and 0.4 mass % of vinyl ethylene carbonate to the solvent.

Example 13

A negative electrode was produced in the same manner as in Example 1 except that the mass ratio of the negative electrode active materials, i.e., the ratio of the graphite having an R value of 0.18 to the graphite having an R value of 0.05 was changed to 50:50. A lithium secondary battery was produced in the same manner as in Example 1 except that this negative electrode was used.

Comparative Example 1

A negative electrode was produced in the same manner as in Example 1 except that the same graphite as the one used in Example 1 having an R value of 0.05 was used as the only negative electrode active material. A lithium secondary battery was produced in the same manner as in Example 1 except that this negative electrode was used.

Comparative Example 2

A lithium secondary battery was produced in the same manner as in Example 1. The only exceptions were that the same PE microporous film as the one used in the production of the separator in Example 1 was used as a separator without forming the porous layer (II) on the film and an electrolyte prepared in the same manner as in Example 1 except not adding succinonitrile as a dinitrile compound to the electrolyte was used. The separator used in this example had a piercing strength of 3.7 N. The pore size (bubble point pore size) measured by the method as described above was 0.033 μm.

Comparative Example 3

A lithium secondary battery was produced in the same manner as in Example 1 except that the following nonaqueous electrolyte was used. The nonaqueous electrolyte was prepared in the same manner as in Example 1 except that succinonitrile as a dinitrile compound was not added to the electrolyte.

Comparative Example 4

A negative electrode was produced in the same manner as in Example 1 except that the mass ratio of the negative electrode active materials, i.e., the ratio of the graphite having an R value of 0.18 to the graphite having an R value of 0.05 was changed to 20:80. A lithium secondary battery was produced in the same manner as in Example 1 except that this negative electrode was used.

Comparative Example 5

A lithium secondary battery was produced in the same manner as in Example 7. The only exception was that the same PE microporous film as the one used in the production of the separator in Example 1 was used as a separator without forming the porous layer (II) on the film.

The discharge capacity, the charge current at a depth of charge of −5° C./10% and the high-temperature storability of each of the lithium secondary batteries of Examples 1 to 13 and Comparative Examples 1 to 5 were measured. The batteries were also subjected to a withstand voltage test.

<Measurement of Discharge Capacity>

The discharge capacity of each of the lithium secondary batteries of Examples 1 to 13 and Comparative Examples 1 to 5 was measured as follows. Each battery was discharged at a constant current of 240 mA (0.2 C) at room temperature (25° C.) until the battery voltage dropped to 3.0 V, and then was charged at a constant current of 240 mA (0.2 C) until the battery voltage rose to 4.2 V. Subsequently, each battery was charged at a constant voltage of 4.2 V until the total charge time reached 8 hours and then discharged at a constant current of 240 mA (0.2 C) until the battery voltage dropped to 3.0 V.

<Measurement of Charge Current at Depth of Charge of −5° C./10%>

Each of the lithium secondary batteries of Examples 1 to 13 and Comparative Examples 1 to 5 was placed in a constant temperature bath at −5° C. for 5 hours. Thereafter, each battery was charged at a constant current of 1200 mA (1.0 C) until the battery voltage rose to 4.2 V. After the battery voltage had reached 4.2 V, each battery was charged at a constant voltage of 4.2 V to measure the current value of each battery at the time the depth of charge (the percentage of the standard capacity that was actually charged) reached 10%.

<Withstand Voltage Test>

Prior to injecting the nonaqueous electrolyte, a voltage of 500 V (AC 60 Hz) was applied to each of the lithium secondary batteries of Examples 1 to 13 and Comparative Examples 1 to 5 (20 batteries each). Batteries through which a current of 5 mA or higher ran were taken as failures and the number of failures was checked.

The reliability of the charge-discharge cycles can be easily degraded as the distance between the electrodes becomes smaller even without the occurrence of a short circuit, and in an extreme scenario, the reliability can be easily degraded as the charge-discharge cycles elapse. A withstand voltage test is a testing means by which the extent of securable reliability can be known. If no electrical breakdown occurs at a certain withstand voltage, it means that the distance between the electrodes is maintained at a level up to the standards. The testing was carried out using a higher voltage to clarify the differences.

In the case of using a positive voltage as a withstand test voltage, 1V would be sufficient just for checking a normal short circuit. However, to further improve the reliability of the test, a withstand test voltage is desirably 50V or higher, more desirably 100V or higher, and particularly desirably 300V or higher. The higher the test voltage, more desirable it is. However, the quality becomes excessive when the voltage is too high. For this reason, the test voltage is desirably 2000V or lower. Furthermore, when the discharge capacity of the battery at 0.2 C expressed in Ah is taken as G (Ah), a determination current value is desirably 2 G (mA) or more, and more desirably 4 G (mA) or more. This is because a current as a capacitor runs through the battery. Further, the detection rate can drop when the determination current is set to a too large value. For this reason, the determination current value is desirably 20 G (mA) or less, and more desirably 10 G (mA) or less. Since the discharge capacity (G) of each of the batteries of Examples and Comparative Examples herein was 1.2 (Ah), 5 mA is in the range of 4 G (mA) to 10 G (mA). It is desirable to incorporate a withstand voltage test into the battery production process because the reliability of the produced battery further improves.

The effect of improving the reliability due to performing a withstand voltage test becomes more noticeable as the thickness of the porous layer (I) is smaller. Although the effect becomes clear when the thickness of the porous layer (I) is 20 µm or less, the effect becomes more effective when the thickness of the porous layer (I) is 14 µm or less, and particularly 12 µm or less.

<Measurement of High-Temperature Storability>

Each of the batteries of Examples 1 to 13 and Comparative Examples 1 to 5 was charged at a constant current of 0.2 C until the battery voltage of each battery rose to 4.2 V, and then was charged at a constant voltage of 4.2 V until the total charge time reached 8 hours. Subsequently, each battery was stored in a constant temperature bath at 85° C. for 4 hours. The thickness of each battery before and after being stored in the bath was measured, and the high-temperature storability of each battery was evaluated based on a change in thickness of each battery (battery swelling) before and after being stored in the bath.

Table 1 provides the results of the measurements and test. In Table 1, the discharge capacity and the charge current value at a depth of charge of −5° C./10% of each battery are relative values, taking the discharge capacity and the charge current value at a depth of charge of −5° C./10% of the battery of Comparative Example 1 as 100.

TABLE 1

|  | Discharge capacity | Charge current value at depth of charge of −5° C./10% | Number of failures in withstand voltage test | Battery swelling (mm) |
| --- | --- | --- | --- | --- |
| Ex. 1 | 100 | 124 | 0 | 0.3 |
| Ex. 2 | 101 | 124 | 0 | 0.3 |
| Ex. 3 | 100 | 123 | 0 | 0.3 |
| Ex. 4 | 100 | 126 | 0 | 0.3 |
| Ex. 5 | 100 | 125 | 0 | 0.3 |
| Ex. 6 | 99 | 125 | 0 | 0.3 |
| Ex. 7 | 100 | 128 | 0 | 0.3 |
| Ex. 8 | 99 | 127 | 0 | 0.3 |
| Ex. 9 | 99 | 127 | 0 | 0.3 |
| Ex. 10 | 96 | 120 | 0 | 0.3 |
| Ex. 11 | 100 | 124 | 0 | 0.35 |
| Ex. 12 | 100 | 120 | 0 | 0.25 |
| Ex. 13 | 102 | 115 | 0 | 0.3 |
| Comp. Ex. 1 | 100 | 100 | 0 | 0.25 |
| Comp. Ex. 2 | 101 | 125 | 2 | 0.5 |
| Comp. Ex. 3 | 100 | 126 | 0 | 0.5 |
| Comp. Ex. 4 | 100 | 104 | 0 | 0.3 |
| Comp. Ex. 5 | 100 | 127 | 5 | 0.3 |

Further, the batteries of Examples 1 and 11 and Comparative Example 5 were subjected to the following overcharging test to observe their exothermic behaviors at the time of being overcharged.

<Overcharging Test>

After being discharged at 1 C (1200 mA) until the battery voltage dropped to 3.0V, the batteries were charged at 0.5 C (600 mA) in an environment at 23° C. until the voltage reached the upper limit of 15V. The surface temperature of each battery at that time was measured to determine the highest temperature. Table 2 provides the results.

TABLE 2

|  | Highest temperature of battery surface (° C.) |
|---|---|
| Ex. 1 | 110 |
| Ex. 11 | 130 |
| Comp. Ex. 5 | 130 or higher |

Next, examples in which acid anhydrides were used as nonaqueous electrolyte additives will be described.

Example 14

A lithium secondary battery was produced in the same manner as in Example 1. The only exception was that instead of adding 0.2 mass % of succinonitrile to the electrolyte, 2 mass % of phthalic anhydride as acid anhydride was added to the electrolyte.

Example 15

A separator was produced in the same manner as in Example 14 by forming the porous layer (II) on a PE microporous film (porous layer (I)). The only exception was that the gap of the micro gravure coater was adjusted so that the porous layer (II) after being dried would have a thickness of 4.3 μm.

The mass per unit area of the porous layer (II) of the obtained separator was 6.0 g/m². Further, the piercing strength of the porous layer (II) of this separator was 3.9 N, the content of the plate-like boehmite in volume was 86 vol %, and the porosity of the porous layer (II) was 55%. Moreover, the pore size (bubble point pore size) of the separator measured by the method as described above was 0.033 μm. Further, the number of the plate-like boehmite particles stacked in the porous layer (II) was 12 to 16.

A lithium secondary battery was produced in the same manner as in Example 14 except that the above separator was used.

Example 16

A separator was produced in the same manner as in Example 14 by forming the porous layer (II) on a PE microporous film (porous layer (I)). The only exception was that the gap and pump discharge of the micro gravure coater was adjusted so that the porous layer (II) after being dried would have a thickness of 7.5 μm.

The mass per unit area of the porous layer (II) of the obtained separator was 9.8 g/m². Further, the piercing strength of the porous layer (II) of this separator was 4.0 N, the content of the plate-like boehmite in volume was 88 vol %, and the porosity of the porous layer (II) was 53%. Moreover, the pore size (bubble point pore size) of the separator measured by the method as described above was 0.033 μm. Further, the number of the plate-like boehmite particles stacked in the porous layer (II) was 22 to 28.

A lithium secondary battery was produced in the same manner as in Example 14 except that the above separator was used.

Example 17

A negative electrode was produced in the same manner as in Example 14 except that the mass ratio of the negative electrode active materials, i.e., the ratio of the graphite having an R value of 0.18 to the graphite having an R value of 0.05 was changed to 90:10. The obtained negative electrode had a total thickness of 144 μm after being calendered. The arithmetic mean roughness (Ra) of the surface of each negative electrode mixture layer was determined with the confocal scanning microscope and it was 0.9 μm.

A lithium secondary battery was produced in the same manner as in Example 14 except that the above negative electrode and an electrolyte to which 2 mass % of butanesulfonic anhydride was added in place of phithalic anhydride were used.

Example 18

A lithium secondary battery was produced in the same manner as in Example 14 except that the same negative electrode as the one produced in Example 17 and the same separator as the one produced in Example 15 were used.

Example 19

A lithium secondary battery was produced in the same manner as in Example 14 except that the same negative electrode as the one produced in Example 17 and the same separator as the one produced in Example 16 were used.

Example 20

A negative electrode was produced in the same manner as in Example 14 except that the same graphite as the one used in Example 14 having an R value of 0.18 was used as the only negative electrode active material. The obtained negative electrode had a total thickness of 145 μm after being calendered. The arithmetic mean roughness (Ra) of the surface of each negative electrode mixture layer was determined with the confocal scanning microscope and it was 1.1 μm.

A lithium secondary battery was produced in the same manner as in Example 14 except that the above negative electrode was used.

Example 21

A lithium secondary battery was produced in the same manner as in Example 14 except that the same negative electrode as the one produced in Example 20 and the same separator as the one produced in Example 15 were used.

Example 22

A lithium secondary battery was produced in the same manner as in Example 14 except that the same negative electrode as the one produced in Example 20 and the same separator as the one produced in Example 16 were used.

Example 23

A lithium secondary battery was produced in the same manner as in Example 14 except that LiCoO₂ was used as the only positive electrode active material.

Example 24

A lithium secondary battery was produced in the same manner as in Example 14 except that at the time of producing a wound electrode body a separator was disposed so that the porous layer (I) faced the positive electrode and the porous layer (II) faced the negative electrode.

Example 25

A lithium secondary battery was produced in the same manner as in Example 14 except that the following electrolyte was used. The electrolyte was produced by dissolving LiPF₆ at a concentration of 1.2 mol/L in a solvent prepared by mixing ethylene carbonate and ethyl methyl carbonate at a volume ratio of 1:2 and adding 2 mass % of phthalic anhydride and OA mass % of vinyl ethylene carbonate to the solvent.

Example 26

A negative electrode was produced in the same manner as in Example 14 except that the mass ratio of the negative electrode active materials, i.e., the ratio of the graphite having an R value of 0.18 to the graphite having an R value of 0.05 was changed to 50:50. A lithium secondary battery was produced in the same manner as in Example 14 except that this negative electrode was used.

Comparative Example 6

A negative electrode was produced in the same manner as in Example 14 except that the same graphite as the one used in Example 1 having an R value of 0.05 was used as the only negative electrode active material. A lithium secondary battery was produced in the same manner as in Example 14 except that this negative electrode was used.

Comparative Example 7

A negative electrode was produced in the same manner as in Example 14 except that the mass ratio of the negative electrode active materials, i.e., the ratio of the graphite having an R value of 0.18 to the graphite having an R value of 0.05 was changed to 20:80. A lithium secondary battery was produced in the same manner as in Example 14 except that this negative electrode was used.

Comparative Example 8

A lithium secondary battery was produced in the same manner as in Example 20. The only exception was that the same PE microporous film as the one used in the production of the separator in Example 14 was used as the separator without forming the porous layer (II) on the film.

The discharge capacity, the charge current at a depth of charge of −5° C./10% and the high-temperature storability of each of the lithium secondary batteries of Examples 14 to 26 and Comparative Examples 6 to 8 were measured. The batteries were also subjected to a withstand voltage test. Table 3 provides these results. In Table 3, the discharge capacity and the charge current value at a depth of charge of −5° C./10% of each battery are relative values, taking the discharge capacity and the charge current value at a depth of charge of −5° C./10% of the battery of Comparative Example 6 as 100.

TABLE 3

| | Discharge capacity | Charge current value at depth of charge of −5° C./10% | Number of failures in withstand voltage test | Battery swelling (mm) |
|---|---|---|---|---|
| Ex. 14 | 100 | 124 | 0 | 0.3 |
| Ex. 15 | 101 | 124 | 0 | 0.3 |
| Ex. 16 | 100 | 123 | 0 | 0.3 |
| Ex. 17 | 100 | 126 | 0 | 0.3 |
| Ex. 18 | 100 | 125 | 0 | 0.3 |
| Ex. 19 | 99 | 125 | 0 | 0.3 |
| Ex. 20 | 100 | 128 | 0 | 0.3 |
| Ex. 21 | 99 | 127 | 0 | 0.3 |
| Ex. 22 | 99 | 127 | 0 | 0.3 |
| Ex. 23 | 96 | 120 | 0 | 0.3 |
| Ex. 24 | 100 | 124 | 0 | 0.35 |
| Ex. 25 | 100 | 120 | 0 | 0.25 |
| Ex. 26 | 102 | 115 | 0 | 0.3 |
| Comp. Ex. 6 | 100 | 100 | 0 | 0.25 |
| Comp. Ex. 7 | 100 | 104 | 0 | 0.3 |
| Comp. Ex. 8 | 100 | 127 | 5 | 0.3 |

The batteries of Examples 14 and 24 and Comparative Example 8 were subjected to an overcharging test in the same manner as described above to observe their exothermic behaviors at the time of being overcharged. Table 4 provides the results.

TABLE 4

| | Highest temperature of battery surface (° C.) |
|---|---|
| Ex. 14 | 110 |
| Ex. 24 | 130 |
| Comp. Ex. 8 | 130 or higher |

Further, examples in which vinyl ethylene carbonate was used as a nonaqueous electrolyte additive will be described.

Example 27

A lithium secondary battery was produced in the same manner as in Example 1. The only exception was that instead of adding 0.2 mass % of succinonitrile to the electrolyte, 2 mass % of vinyl ethylene carbonate was added to the electrolyte.

Example 28

A separator was produced in the same manner as in Example 27 by forming the porous layer (II) on a PE microporous film (porous layer (I)). The only exception was that the gap of the micro gravure coater was adjusted so that the porous layer (II) after being dried would have a thickness of 4.3 μm.

The mass per unit area of the porous layer (II) of the obtained separator was 6.0 g/m². Further, the piercing strength of the porous layer (II) of this separator was 3.9 N, the content of the plate-like boehmite in volume was 86 vol %, and the porosity of the porous layer (II) was 55%. Moreover, the pore size (bubble point pore size) of the separator measured by the method as described above was 0.033 μm. Further, the number of the plate-like boehmite particles stacked in the porous layer (II) was 12 to 16.

A lithium secondary battery was produced in the same manner as in Example 27 except that the above separator was used.

Example 29

A separator was produced in the same manner as in Example 27 by forming the porous layer (II) on a PE microporous film (porous layer (I)). The only exception was that the gap and pump discharge of the micro gravure coater was adjusted so that the porous layer (II) after being dried would have a thickness of 7.5 µm.

The mass per unit area of the porous layer (II) of the obtained separator was 9.8 g/m$^2$. Further, the piercing strength of the porous layer (II) of this separator was 4.0 N, the content of the plate-like boehmite in volume was 88 vol %, and the porosity of the porous layer (II) was 53%. Moreover, the pore size (bubble point pore size) of the separator measured by the method as described above was 0.033 µm. Further, the number of the plate-like boehmite particles stacked in the porous layer (II) was 22 to 28.

A lithium secondary battery was produced in the same manner as in Example 27 except that the above separator was used.

Example 30

A negative electrode was produced in the same manner as in Example 27 except that the mass ratio of the negative electrode active materials, i.e., the ratio of the graphite having an R value of 0.18 to the graphite having an R value of 0.05 was changed to 90:10. The obtained negative electrode had a total thickness of 144 µm after being calendered. The arithmetic mean roughness (Ra) of the surface of each negative electrode mixture layer was determined with the confocal scanning microscope and it was 0.9 µm.

A lithium secondary battery was produced in the same manner as in Example 27 except that the above separator was used.

Example 31

A lithium secondary battery was produced in the same manner as in Example 27 except that the same negative electrode as the one produced in Example 30 and the same separator as the one produced in Example 28 were used.

Example 32

A lithium secondary battery was produced in the same manner as in Example 27 except that the same negative electrode as the one produced in Example 30 and the same separator as the one produced in Example 29 were used.

Example 33

A negative electrode was produced in the same manner as in Example 27 except that the same graphite as the one used in Example 27 having an R value of 0.18 was used as the only negative electrode active material. The obtained negative electrode had a total thickness of 145 µm after being calendered. The arithmetic mean roughness (Ra) of the surface of each negative electrode mixture layer was determined with the confocal scanning microscope and it was 1.1 µm.

A lithium secondary battery was produced in the same manner as in Example 27 except that the above negative electrode was used.

Example 34

A lithium secondary battery was produced in the same manner as in Example 27 except that the same negative electrode as the one produced in Example 33 and the same separator as the one produced in Example 28 were used.

Example 35

A lithium secondary battery was produced in the same manner as in Example 27 except that the same negative electrode as the one produced in Example 33 and the same separator as the one produced in Example 29 were used Example 36

A lithium secondary battery was produced in the same manner as in Example 27 except that $LiCoO_2$ was used as the only positive electrode active material.

Example 37

A lithium secondary battery was produced in the same manner as in Example 27 except that at the time of producing a wound electrode body a separator was disposed so that the porous layer (I) faced the positive electrode and the porous layer (II) faced the negative electrode.

Example 38

A lithium secondary battery was produced in the same manner as in Example 27 except that the following electrolyte was used. The electrolyte was produced by dissolving $LiPF_6$ at a concentration of 1.2 mol/L in a solvent prepared by mixing ethylene carbonate and ethyl methyl carbonate at a volume ratio of 1:2 and adding 2 mass % of vinyl ethylene carbonate and 0.5 mass % of vinylene carbonate to the solvent.

Example 39

A negative electrode was produced in the same manner as in Example 27 except that the mass ratio of the negative electrode active materials, i.e., the ratio of the graphite having an R value of 0.18 to the graphite having an R value of 0.05 was changed to 50:50. A lithium secondary battery was produced in the same manner as in Example 27 except that this negative electrode was used.

Comparative Example 9

A negative electrode was produced in the same manner as in Example 27 except that the same graphite as the one used in Example 27 having an R value of 0.05 was used as the only negative electrode active material. A lithium secondary battery was produced in the same manner as in Example 27 except that this negative electrode was used.

Comparative Example 10

A negative electrode was produced in the same manner as in Example 27 except that the mass ratio of the negative electrode active materials, i.e., the ratio of the graphite having an R value of 0.18 to the graphite having an R value of 0.05 was changed to 20:80. A lithium secondary battery was produced in the same manner as in Example 27 except that this negative electrode was used.

Comparative Example 11

A lithium secondary battery was produced in the same manner as in Example 33. The only exception was that the same PE microporous film as the one used in the production of the separator in Example 27 was used as the separator without forming the porous layer (II) on the film.

The discharge capacity, the charge current at a depth of charge of −5° C./10% and the high-temperature storability of each of the lithium secondary batteries of Examples 27 to 39 and Comparative Examples 9 to 11 were measured. The batteries were also subjected to a withstand voltage test. Table 5 provides these results. In Table 5, the discharge capacity and the charge current value at a depth of charge of −5° C./10% of each battery are relative values, taking the discharge capacity and the charge current value at a depth of charge of −5° C./10% of the battery of Comparative Example 9 as 100.

TABLE 5

|  | Discharge capacity | Charge current value at depth of charge of −5° C./10% | Number of failures in withstand voltage test | Battery swelling (mm) |
| --- | --- | --- | --- | --- |
| Ex. 27 | 100 | 124 | 0 | 0.3 |
| Ex. 28 | 101 | 124 | 0 | 0.3 |
| Ex. 29 | 100 | 123 | 0 | 0.3 |
| Ex. 30 | 100 | 126 | 0 | 0.3 |
| Ex. 31 | 100 | 125 | 0 | 0.3 |
| Ex. 32 | 99 | 125 | 0 | 0.3 |
| Ex. 33 | 100 | 128 | 0 | 0.3 |
| Ex. 34 | 99 | 127 | 0 | 0.3 |
| Ex. 35 | 99 | 127 | 0 | 0.3 |
| Ex. 36 | 96 | 120 | 0 | 0.3 |
| Ex. 37 | 100 | 124 | 0 | 0.35 |
| Ex. 38 | 100 | 120 | 0 | 0.25 |
| Ex. 39 | 102 | 115 | 0 | 0.3 |
| Comp. Ex. 9 | 100 | 100 | 0 | 0.25 |
| Comp. Ex. 10 | 100 | 104 | 0 | 0.3 |
| Comp. Ex. 11 | 100 | 127 | 5 | 0.3 |

Further, the batteries of Examples 27 and 37 and Comparative Example 11 were subjected to an overcharging test in the same manner as described above to observe their exothermic behaviors at the time of being overcharged. Table 6 provides the results.

TABLE 6

|  | Highest temperature of battery surface (° C.) |
| --- | --- |
| Ex. 27 | 110 |
| Ex. 37 | 130 |
| Comp. Ex. 11 | 130 or higher |

The lithium secondary batteries of Examples 1 to 39 of the present invention each used: the separator including the porous layer (I) composed of a microporous film composed predominantly of a thermoplastic resin and the porous layer (II) containing a filler having a heat-resistant temperature of 150° C. or higher as the main component; the negative electrode containing graphite having an R value of 0.1 to 0.5 and $d_{002}$ of 0.338 nm or less, where the R value is a ratio of a peak intensity at 1360 cm$^{-1}$ to a peak intensity at 1580 cm$^{-1}$ in an argon ion laser Raman spectrum and the $d_{002}$ is a lattice spacing between 002 planes, the ratio of the graphite to the negative electrode active material being 30 mass % or more; and the nonaqueous electrolyte containing vinyl ethylene carbonate or a derivative thereof; or a dinitrile compound or acid anhydride. Thus, the batteries had excellent low-temperature charge characteristics, no withstand voltage failures, an excellent level of safety in the event of being overcharged and excellent high-temperature storability.

In particular, because the porous layer (II) of the separator was disposed to face the positive electrode, the high-temperature storability improved further, resulting in the lithium secondary batteries with a more excellent level of safety.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

Industrial Applicability

The electrochemical device of the present invention can be preferably used for a variety of application purposes to which conventionally known electrochemical devices such as a lithium secondary battery are applied (e.g., a power source for mobile electric equipment such as a mobile telephone and a notebook personal computer).

| Description of Reference Numerals | |
| --- | --- |
| 1 | negative electrode |
| 2 | positive electrode |
| 3 | separator |

The invention claimed is:

1. An electrochemical device comprising a positive electrode, a negative electrode, a nonaqueous electrolyte, and a separator,
    wherein the separator comprises a porous layer (I) composed of a microporous film composed predominantly of a thermoplastic resin and a porous layer (II) containing a filler having a heat-resistant temperature of 150° C. or higher as the main component,
    the porous layer (II) has a thickness of 2 μm or more,
    the filler having a heat-resistant temperature of 150° C. or higher contained in the porous layer (II) makes up 70 vol % or more of a total volume of components of the porous layer (II),
    the negative electrode contains graphite having an R value of 0.1 to 0.5 and $d_{002}$ of 0.338 nm or less as a negative electrode active material, where the R value is a ratio of a peak intensity at 1360 cm$^{-1}$ to a peak intensity at 1580 cm$^{-1}$ in an argon ion laser Raman spectrum and the $d_{002}$ is a lattice spacing between 002 planes,
    a ratio of the graphite to the negative electrode active material is 30 mass % or more,
    a surface of a negative electrode mixture layer has an arithmetic mean roughness of 0.7 μm or more, and
    the nonaqueous electrolyte contains a dinitrile compound or acid anhydride.

2. The electrochemical device according to claim 1, wherein a ratio of T1 to T2 (T1/T2) is 1 or more and 10 or less, where T1 is the thickness of the porous layer (I) and T2 is the thickness of the porous layer (II), and the negative electrode further contains graphite having an R value of less than 0.1 as the negative electrode active material.

3. The electrochemical device according to claim 1, wherein a content of the dinitrile compound in the nonaqueous electrolyte is 0.01 to 1 mass %.

4. The electrochemical device according to claim 1, wherein a content of the acid anhydride in the nonaqueous electrolyte is 0.5 to 5 mass %.

5. The electrochemical device according to claim 1, wherein at least a part of the filler is in the form of plate-like particles, and the porous layer (II) has a thickness of 4 μm or more.

6. The electrochemical device according to claim 1, wherein the filler is composed of particles of at least one element selected from the group consisting of alumina, silica, and boehmite.

7. The electrochemical device according to claim 1, wherein the thermoplastic resin is polyolefin having a melting point of 80 to 150° C.

8. The electrochemical device according to claim 1, wherein the porous layer (II) faces the positive electrode.

9. The electrochemical device according to claim 1, wherein the nonaqueous electrolyte further contains vinyl ethylene carbonate or a derivative thereof.

10. An electrochemical device comprising a positive electrode, a negative electrode, a nonaqueous electrolyte, and a separator, wherein the separator comprises a porous layer (I) composed of a microporous film composed predominantly of a thermoplastic resin and a porous layer (II) containing a filler having a heat-resistant temperature of 150° C. or higher as the main component, the porous layer (II) has a thickness of 2 μm or more, the filler having a heat-resistant temperature of 150° C. or higher contained in the porous layer (II) makes up 70 vol % or more of a total volume of components of the porous layer (II), the negative electrode contains graphite having an R value of 0.1 to 0.5 and $d_{002}$ of 0.338 nm or less as a negative electrode active material, where the R value is a ratio of a peak intensity at 1360 cm$^{-1}$ to a peak intensity at 1580 cm$^{-1}$ in an argon ion laser Raman spectrum and the $d_{002}$ is a lattice spacing between 002 planes, a ratio of the graphite to the negative electrode active material is 30 mass % or more, a surface of a negative electrode mixture layer has an arithmetic mean roughness of 0.7 μm or more, and the nonaqueous electrolyte contains vinyl ethylene carbonate or a derivative thereof.

11. The electrochemical device according to claim 10, wherein the negative electrode further contains graphite having an R value of less than 0.1 as the negative electrode active material.

12. The electrochemical device according to claim 10, wherein a content of the vinyl ethylene carbonate or derivative thereof in the nonaqueous electrolyte is 0.5 to 5 mass %.

13. The electrochemical device according to claim 10, wherein at least a part of the filler is in the form of plate-like particles.

14. The electrochemical device according to claim 10, wherein the filler is composed of particles of at least one element selected from the group consisting of alumina, silica, and boehmite.

15. The electrochemical device according to claim 10, wherein the thermoplastic resin is polyolefin having a melting point of 80 to 150° C.

16. The electrochemical device according to claim 10, wherein the porous layer (II) faces the positive electrode.

* * * * *